US006847193B2

(12) United States Patent
Sakuragi

(10) Patent No.: US 6,847,193 B2
(45) Date of Patent: Jan. 25, 2005

(54) CONTROL CIRCUIT FOR CHARGING AND DISCHARGING, ILLUMINATING APPARATUS AND DRIVING METHOD THEREOF

(75) Inventor: Harumi Sakuragi, Tokushima (JP)

(73) Assignee: Nichia Corporation, Anan (JP)

( * ) Notice: Subject to any disclaimer, the term of this patent is extended or adjusted under 35 U.S.C. 154(b) by 70 days.

(21) Appl. No.: 10/437,449

(22) Filed: May 14, 2003

(65) Prior Publication Data

US 2003/0227278 A1 Dec. 11, 2003

(30) Foreign Application Priority Data

May 17, 2002 (JP) ....................................... 2002-142432
Apr. 10, 2003 (JP) ....................................... 2003-107044

(51) Int. Cl.[7] ............................................... H01M 10/46
(52) U.S. Cl. ....................................................... 320/166
(58) Field of Search ................................ 320/127, 128, 320/166; 345/45, 46, 76; 315/169.1, 169.2, 169.3, 169.4

(56) References Cited

U.S. PATENT DOCUMENTS 5,844,368 A 12/1998 Okuda et al.
6,339,415 B2 * 1/2002 Ishizuka ...................... 345/76
2002/0093469 A1 * 7/2002 Suzuki et al. ................. 345/60
2004/0066357 A1 * 4/2004 Kawasaki .................... 345/76
2004/0164301 A1 * 8/2004 Suzuki et al. ................. 257/72

FOREIGN PATENT DOCUMENTS

JP 9-232074 A 9/1997
JP 11-161219 A 6/1999
JP 2001-109433 A 4/2001

* cited by examiner

*Primary Examiner*—Edward H. Tso
(74) *Attorney, Agent, or Firm*—Smith Patent Office

(57) ABSTRACT

It is an object of the present invention to provide a control circuit for charging and discharging (43) etc., which can prevent an undesirable-emission caused by a residual charge, capable of obtaining a high-quality display and so on. The control circuit for charging and discharging (43) includes a driven element ($E_{1,1}$–$E_{256,64}$) with a driving-on status and a driving-off status; a charging element, whose one end is grounded; and a driving circuit (44), which is connected to the driven element ($E_{1,1}$–$E_{256,64}$), for controlling the driving-on status or the driving-off status in the driven element. The control circuit further includes a charging path, which is connected to the driven element ($E_{1,1}$–$E_{256,64}$), for charging the charging element with a residual charge, which is produced in the driven element ($E_{1,1}$–$E_{256,64}$) and/or a line connected to the driven element ($E_{1,1}$–$E_{256,64}$) during the driving-on status, and a discharging path, which is connected to the charging path, for discharging the residual charge from the charging element to a ground in the driving-on status.

41 Claims, 12 Drawing Sheets

CONTROL CIRCUIT FOR CHARGING AND DISCHARGING, ILLUMINATING APPARATUS AND DRIVING METHOD THEREOF

This application is based on Application No. 2002-142432 filed in Japan on May 17, 2002, and No. 2003-107044 filed in Japan on Apr. 10, 2003, the contents of which are incorporated hereinto by references.

BACKGROUND OF THE INVENTION

1. Field of the Invention

The present invention relates to a control circuit for charging and discharging, an illuminating apparatus and a driving method thereof, which control charging and discharging in an illuminating apparatus with a display portion composed of driven elements such as liquid crystal display or a plurality of light-emitting elements and so on.

2. Discussion of the Related Art

Recently, more than 1000 mcd of high-luminance light-emitting diodes have been developed for each of RGB, and production of large-scale LED display is started. The LED displays have characteristics that they can be lightweight and thinned, and they consume less power, etc. Hence, a demand for the LED displays as large-scale displays that can be used outdoors has been sharply increasing.

Practically, the large-scale LED display is composed of a plurality of LED units, which are combined corresponding to an installed location. The LED unit is composed of RGB of light-emitting diodes arranged in a dot matrix on a circuit board.

In addition, a driving circuit capable of driving each light-emitting diode individually is provided for the LED display. Concretely, LED-controlling devices transferring display data for respective LED units are connected in the LED display. A plurality of them is connected, and composes one large-scale display. In the case of a large-scale LED display, the number of the used LED units is increased, and one LED display is composed of, for example, a total of 120,000 LED units in 300×400.

Additionally, the dynamic driving method is used as a driving method of LED display. A concrete example is connected and driven as follows.

For example, in the case of an LED unit composed of m rows and n columns of a dot matrix, anode terminals of the light-emitting diodes (LEDs) arranged in each row are commonly connected to one of common source lines, and cathode terminals of the light-emitting diodes (LEDs) arranged in each column are commonly connected to one of current lines.

Then, m rows of common lines are switched ON successively at a predetermined period for displaying. In addition, a decoder circuit switches the m rows of common lines based on an address signal, for example.

Although an LED display apparatus using light-emitting diodes is explained above, the similar driving circuit (method) can also drive an electroluminescence display apparatus, a field emission type display apparatus (FED), or a liquid crystal display or the like.

However, there is a problem that electric charge remains in light-emitting diodes (light-emitting elements) connected to the common source line, which is not selected, or light-off status, while the light-emitting diodes (light-emitting elements), which are connected to the selected common source line, emit. Such a residual charge, which remains in the unselected period, produces an undesirable current when the common source line is selected. Such produced undesirable current reduces display quality because of undesirable-emission that the light-emitting diode, which is controlled not emitting, slightly emits, and insufficient contrast in display image. Accordingly, as shown in FIG. 3, a method of discharging the charge, which remains in the anode terminal of light-emitting diode connected to the unselected common source line, to ground by a circuit 37 composed of only resistor (R1) in the driving circuit is used. While, even using the circuit 37, if the light-emitting diode does not have enough rectification function, the undesirable current is produced in the other unselected common source line along a path shown by the arrow in FIG. 3. Therefore, the circuit cannot prevent the undesirable-emission that the light-emitting diode, which is controlled not emitting, slightly emits. The undesirable current caused by the residual charge etc. reduces display quality. Such a residual charge is produced not only in light-emitting elements but also in driven elements with a parasitic capacitance, which is driven in a driving-on status or a driving-off status. For example, there is the same problem in voltage control elements in a liquid crystal display. Additionally, this residual charge is produced not only in elements themselves but also in traces etc. connected to the elements as stray capacitances. Especially, in a large-scale display with long traces or numbers of traces, there is a problem such as an undesirable emission, false displaying, and false driving.

It is an object of the present invention to provide a control circuit for charging and discharging, an illuminating apparatus and a driving method thereof, which can reduce an influence of the above residential charge and can obtain a high-quality display such as an LED display, a liquid crystal display, an EL display, and a photoreceptor apparatus such as a CCD.

SUMMARY OF THE INVENTION

To achieve the above object, a control circuit for charging and discharging according to the present invention comprises a driven element with a driving-on status and a driving-off status; a charge element, whose one end is grounded; a driving circuit, which is connected to the driven element, for controlling the driving-on status or the driving-off status in the driven element; a charging path, which is connected to the driven element, for charging the charge element with a residual charge, which is produced in the driven element and/or a line connected to the driven element during the driving-on status, and a discharging path, which is connected to the charging path, for discharging the residual charge from the charge element to a ground in the driving-on status.

In the control circuit for charging and discharging according to the present invention, the control circuit further comprises a plurality of the driven elements arranged in a matrix with m rows and n columns, a first line provided for each column and connected to one terminal of each of the driven elements arranged in each column, and a second line provided for each row and connected to another terminal of each of the driven elements arranged in each row, wherein, the control circuit controls activation of at least one of the first line and the second line.

In the control circuit for charging and discharging according to the present invention, the charging path and discharging path, whose one end is grounded through the charging element.

In the control circuit for charging and discharging according to the present invention, the charging path includes a load.

In the control circuit for charging and discharging according to the present invention, the discharging path includes a rectifier.

In the control circuit for charging and discharging according to the present invention, the charging path is connected to an anode terminal side of the driven element.

In the control circuit for charging and discharging according to the present invention, one end of the rectifier is connected to the charge element, and another end is grounded.

In the control circuit for charging and discharging according to the present invention, the driven element is a semiconductor element with a parasitic capacitance.

In the control circuit for charging and discharging according to the present invention, the charge element is a capacitor.

In the control circuit for charging and discharging according to the present invention, the load is a resistor.

In the control circuit for charging and discharging according to the present invention, the rectifier is a diode.

In the control circuit for charging and discharging according to the present invention, the driven element is a light-emitting semiconductor.

In the control circuit for charging and discharging according to the present invention, the driven element is an LED.

In the control circuit for charging and discharging according to the present invention, the driven element is a light-emitting element, and the control circuit for charging and discharging acts as an undesirable-emission-preventing circuit for preventing an undesirable emission in the light-emitting element.

In the control circuit for charging and discharging according to the present invention, the charging path and the discharging path are the same path, and the residual charge charged in the charge element is discharged as a driving current for the driven element during driving-on status.

Further, to achieve the above object, an illuminating apparatus comprises a driven element with a driving-on status and a driving-off status; a charge element, whose one end is +grounded; a driving circuit, which is connected to the driven element, for controlling the driving-on status or the driving-off status in the driven element; a charging path, which is connected to the driven element, for charging the charge element with a residual charge, which is produced in the driven element and/or a line connected to the driven element during the driving-off status, and a discharging path, which is connected to the charging element, for discharging the residual charge from the charge element to a ground in the driving-on status.

In the illuminating apparatus according to the present invention, the control circuit further comprises a plurality of the driven elements arranged in a matrix with m rows and n columns, a first line provided for each column and connected to one terminal of each of the driven elements arranged in each column, and a second line provided for each row and connected to another terminal of each of the driven elements arranged in each row, wherein, the control circuit controls activation of at least one of the first line and the second line.

In the illuminating apparatus according to the present invention, the charging path and discharging path, whose one end is grounded through the charging element.

In the illuminating apparatus according to the present invention, the charging path includes a load.

In the illuminating apparatus according to the present invention, the discharging path includes a rectifier.

In the illuminating apparatus according to the present invention, the charging path is connected to an anode terminal side of the driven element.

In the illuminating apparatus according to the present invention, one end of the rectifier is connected to the charge element, and another end is grounded.

In the illuminating apparatus according to the present invention, the driven element is a semiconductor element with a parasitic capacitance.

In the illuminating apparatus according to the present invention, the charge element is a capacitor.

In the illuminating apparatus according to the present invention, the load is a resistor.

In the illuminating apparatus according to the present invention, the rectifier is a diode.

In the illuminating apparatus according to the present invention, the driven element is a light-emitting semiconductor.

In the illuminating apparatus according to the present invention, the driven element is an LED.

In the illuminating apparatus according to the present invention, the driven element is a light-emitting element, and the control circuit for charging and discharging acts as an undesirable-emission-preventing circuit for preventing an undesirable emission in the light-emitting element.

In the illuminating apparatus according to the present invention, the charging path and the discharging path are the same path, and the residual charge charged in the charge element is discharged as a driving current for the driven element during driving-on status.

Further to achieve the above object, the illuminating apparatus according to the present invention comprises: a display portion including a plurality of light-emitting elements arranged in a matrix with m rows and n columns, a current line provided for each column and connected to a cathode terminal of each of the light-emitting elements arranged in each column, and a common source line provided for each row and connected to an anode terminal of each of the light-emitting elements arranged in each row; and a driving circuit, whose status of a driving-on status or a diving-off status is controlled by a lighting control signal input thereto, for controlling activation of each common source line based on display data input in each driving-on status; wherein, the driving circuit includes an undesirable-emission-preventing circuit having a charging path connected to the anode terminal of each of the light-emitting elements and the driving circuit, and charging a charging element with a residual charge, which is produced in the anode terminal side of light-emitting element when the status is changed from the driving-on status to the driving-off status, in the driving off status, and a discharging path connected to the charging element, and discharging the residual charge from the charging element to a ground in the driving-on status.

In such a construction, an undesirable charge remaining in each light-emitting element or in its periphery is charged in the charging element during driving-off status, and is discharged during driving-on status. An influence caused by a residual charge can be substantially eliminated in driving-on status, in which the desired light-emitting elements emit, and it is possible to provide an illuminating apparatus with high display quality.

In the illuminating apparatus according to the present invention, the discharging path is connected to the charging path, and is grounded via the driving circuit.

In such a construction, an influence caused by a residual charge can be substantially eliminated in driving-on status, in which the desired light-emitting elements emit, and it is possible to provide an illuminating apparatus with high display quality.

In the illuminating apparatus according to the present invention, the driving circuit further includes a current-source switching circuit, which has m of switching circuits connected to the corresponding common source lines, capable of connecting the common source line addressed by an address signal input thereto in the driving-on status to a current source, and a constant-current circuit portion, which has memory circuits storing n sets of gradation data of the display data input in series, activating the current line corresponding to each set of the gradation data during gradation width based on each set of the gradation data stored in the memory circuit in the driving-on status.

In such a construction, an influence caused by a residual charge can be substantially eliminated in driving-on status, in which the desired light-emitting elements emit, and it is possible to provide an illuminating apparatus with high display quality.

In the illuminating apparatus according to the present invention, the charging path includes the charging element, whose one end is connected to the anode terminal side of each of the light-emitting elements and another end is grounded.

In such a construction, an influence caused by a residual charge can be substantially eliminated in driving-on status, in which the desired light-emitting elements emit, and it is possible to provide an illuminating apparatus with high display quality easily.

In the illuminating apparatus according to the present invention, the discharging path includes a rectifier, whose anode terminal is connected to the charging path and cathode terminal is connected to the ground side.

Thus, providing the discharging path including the rectifier can discharge the residual charge reliably, and an influence caused by a residual charge can be substantially eliminated. Accordingly, it is possible to provide an illuminating apparatus with high display quality easily.

In the illuminating apparatus according to the present invention, the charging path includes at least one resistor.

In such a construction, the residual charge can be discharged reliably, and an influence caused by a residual charge can be substantially eliminated. Accordingly, it is possible to provide an illuminating apparatus with high display quality easily.

In the illuminating apparatus according to the present invention, the light-emitting element is a light-emitting diode.

In such a construction, an influence caused by a residual charge can be substantially eliminated in driving-on status, in which the desired light-emitting elements emit, and it is possible to provide an illuminating apparatus with high display quality easily.

In the illuminating apparatus according to the present invention, the charging element is a capacitor.

In such a construction, an influence caused by a residual charge can be substantially eliminated in driving-on status, in which the desired light-emitting elements emit, and it is possible to provide an illuminating apparatus with high display quality easily.

In the illuminating apparatus according to the present invention, the rectifier is a diode.

In such a construction, an influence caused by a residual charge can be substantially eliminated in driving-on status, in which the desired light-emitting elements emit, and it is possible to provide an illuminating apparatus with high display quality easily.

In the illuminating apparatus according to the present invention, the illuminating apparatus is an LED display.

In such a construction, an influence caused by a residual charge can be substantially eliminated in driving-on status, in which the desired light-emitting elements emit, and it is possible to provide an illuminating apparatus with high display quality easily.

Furthermore, a driving method of an illuminating apparatus according to the present invention, which has a display portion including a plurality of light-emitting elements arranged in a matrix with m rows and n columns, a current line provided for each column and connected to a cathode terminal of each of the light-emitting elements arranged in each column, and a common source line provided for each row and connected to an anode terminal of each of the light-emitting elements arranged in each row, and a driving circuit, whose status of a driving-on status or a diving-off status is controlled by a lighting control signal input thereto, for controlling activation of each common source line based on display data input in each driving-on status, comprises the steps of controlling the status, driving-on status or driving-off status, by an input lighting control signal controlling the status, light-on status or light-off status; controlling activation at one end of each common source line and at one end of the current source line based on display data input in each driving-on status; charging a charging element with a residual charge, which is produced in the anode terminal side of light-emitting element when status is changed from the driving-on status to the driving-off status, in the driving-off status by a charging path connected to an anode terminal of each light-emitting elements and the driving circuit; and discharging the residual charge from the charging element to a ground in the driving-on status by a discharging path connected to the charging path and grounded.

In such a driving method, undesirable charge remaining in each light-emitting element or in its periphery is charged in the charging element during driving-off status, and is discharged during driving-on status. An influence caused by a residual charge can be substantially eliminated in driving-on status, in which the desired light-emitting elements emit, and it is possible to use as an illuminating apparatus with high display quality.

In such a construction, a residual charge accumulated in a light-emitting element, a driven element, a periphery portion, a connected trace or the like during driving-on status is charged in a charging element via a charging path during driving-off status, and is discharged via a discharging path. Therefore, an influence of the residual charge can be substantially eliminated in the driving-on status, in which a predetermined light-emitting element emits or a driven element is driven. It is possible to provide a control circuit for charging and discharging, an illuminating apparatus and a driving method thereof, which can obtain a high-quality display.

Further, in the driving-on status, in which a predetermined light-emitting element emits or a driven element is driven, an influence of the residual charge can be substantially eliminated. It is possible to provide a control circuit for charging and discharging, an illuminating apparatus and a driving method thereof, which can obtain a high-quality display.

Furthermore, a discharging path including a rectifier can discharge a residual charge properly. Therefore, an influence of a residual charge can be substantially eliminated. It is possible to provide a control circuit for charging and discharging, an illuminating apparatus and a driving method thereof, which can obtain a high-quality display.

Moreover, in a construction with such a control circuit for charging and discharging, a residual charge accumulated in a charge element, a periphery trace or the like during driving-on status is charged in a charging element via a charging path during driving-off status, and is discharged via a discharging path. Therefore, in the driving-on status, in which a predetermined light-emitting element, a driven element or a charge element is driven, an influence of the residual charge can be substantially eliminated. It is possible to provide a control circuit for charging and discharging, an illuminating apparatus and a driving method thereof, which can obtain a high-quality display.

Driving-On Status and Driving-Off Status

Typically, when a driven element is a current-driven element, applying a desired current can bring in driving-on status. When a driven element is a voltage-driven element, applying a desired voltage can bring in a driving-on status. When an inverting element, an inverter circuit or the like is provided, a status brought by applying a current or a voltage can be inverted in the driving-off status or the driving-on status. Various kinds of statuses brought by applying a current or a voltage can be set corresponding to characteristics of driven elements. Even an element under control other than a current or a voltage such as an electric field or a magnetic field has a driving-on status and a driving-off status. A driving-on status and a driving-off status in the present invention include two or more deferent statuses, which can be recognized or can be observed or can be measured. A driving-on status can have two or more driving-on levels. On the other hand, a driving-off status can have two or more driving-off levels.

In the present invention, a driven element refers to an element or a device, which is driven based on a driving control signal etc. Typically, the driven element is a element with a capacitance such as a light-emitting semiconductor diode, a liquid crystal device, an EL device, a laser diode, a CCD, a photo diode, a photo transistor, a semiconductor memory, a CPU, various kinds of sensors, various kinds of electronic devices, a semiconductor element, a rectifying element including a diode or a thyristor, a light-emitting element, or a photo detector. Further, the driven element includes an element with any capacitance such as parasitic capacitance, for example, various kinds of transistors such as a diode, a bipolar, an FET or a HEMT, or a capacitor, irrespective of the light-emitting or non-light-emitting element. A driven element can be controlled by a voltage, a current, an electric field, magnetic field, a pressure, an acoustic wave, an electromagnetic wave, a radio wave, an optical wave or the like. A driven element in the present invention is not specifically limited. A driven element in the present invention refers to not only a single element, but also a device having a plurality of elements. For example, a driven element can be one pixel or a pixel group driving a plurality of LEDs as one pixel, or can be one array or an array group such as a semiconductor laser diode array. In this sense, a driven element can be one unit to be driven.

Charging Element Whose One End is Grounded

In the present invention, a charging element typically refers to a capacitor. However, any kind of element or device, which can temporarily accumulate even a small amount of charge and can release the charge, can be used as a charging element in the present invention. In addition, it is not always necessary to release the whole amount of charge temporarily accumulated in the charging element. While the residual charge to be charged is a residual charge accumulated in a driven element, a periphery portion, a connected trace or the like, the residual charge to be charged can be the whole of or a part of charge accumulated therein. A charging element, whose one end is grounded, refers to a charging element, whose one end is electrically connected to substantially a ground level. In this sense, a concrete construction of a circuit is not specifically limited as long as being electrically connected. It is not always necessary to normally ground the circuit. The circuit can be grounded when required corresponding to circuit driving. For example, the circuit can be connected a predetermined voltage (5 V) or a ground by a switching circuit. Additionally, an electric element can be provided between one end of a charging element and a ground, and one end of a charging element can be biased as long as capable of charging and discharging control driving on a charging element in the present invention.

Connection

In the present invention, connection refers to electrically connecting, and not to only physically connecting. Recently, a communication in data or energy by an optoelectronic element such as an OEIC (optoelectronic integrated circuit) has been developed. The connection in the present invention also includes such a communication in a medium as data such as a electromagnetic medium including an electric medium and an optical medium, a pressure, an acoustic medium, heat, irrespective of directly connecting or indirectly connecting. In addition, it is not always necessary to normally connect. The connection in the present invention includes connecting when required (for example, when a charge, an electric medium or a current flows) corresponding to a status of a driving circuit by a switching circuit or a selecting circuit.

Residual Charge Produced in Traces Connected to Driven Element

A residual charge is typically produced in a charge element with a parasitic capacitance. However a residual charge is also produced in traces connected to a driven element without a parasitic capacitance or a periphery portion as stray capacitances. When the length of the traces or the number of the traces is increased, such a residual charge is also increased. This residual charge accelerates an undesirable emission, false driving, false displaying or a misoperation. The present invention can solve the above problem to eliminate such a residual charge including that produced in traces connected to a driven element. An amount of an optimum residual charge at start for driving is deferent corresponding to a used driven element based on an initial driving voltage in operation or an initial driving current in operation. When a residual charge is eliminated, a residual charge can be eliminated so as to be such a desired optimum amount of a charge. A residual charge can be eliminated so as to be a level practically used without a misoperation, false driving or an undesirable emission. It is not necessary to eliminate the whole residual charge. In a light-emitting diode of the embodiment shown in FIG. 2 as a typical example, it is preferable that a residual charge is eliminated so as to be zero as less as possible. Adjusting a desired load, a charging element, a rectifier or the like can adjust an amount of a residual charge to be eliminated. Needless to say, a residual charge in the present invention includes both of a positive and negative residual charge corresponding to a driven element. In addition, adjusting a bias of a control circuit for charging and discharging can not only eliminate a residual charge but also can give a charge of the polarity opposite to driving. For example, when a driven element is a rectifying element with a rectification (typically a diode or a light-emitting diode), a control circuit for charging and discharging is adjusted to give a charge of the polarity opposite to driving, and a current detector is additionally provided. This can detect or can confirm or can inspect a leak current of a driven rectifying element.

Charging Path

In the present invention, a charging path refers to a path to charge a charging element with a charge. A charging path is connected so that the whole of or a part of charge flows from a driven element, a periphery portion thereof or traces connected to a driven element to a charging element. It is not always necessary to normally connect. It is preferable that a charging path has a resistance lower than the driven element at charging so that a charge smoothly flows. It is more preferable that a resistance of a charging path is about 1 kΩ.

Grounded End

In the present invention, a grounded end refers to an end connected to a ground. Any length of trace from a grounded end to a ground can be used. In addition, a device etc. can be provided between a grounded end and a ground. That is, direct grounding or indirect grounding can be used.

Discharging Path

In the present invention, a discharging path refers to a path to release a charge from a charging element. A discharging path is connected so that the whole of or a part of accumulated charge flows from a charging element to a ground or a desired discharging point. It is not always necessary to normally connect. A discharging path can include a switching circuit or a rectifier such as a transistor for controlling a discharging timing. A charge can be discharged to a ground. In addition, A charge can be discharged so as to act as the whole of or a part of current for a driven element. This does not waste a residual charge and can make effective use of it by reusing. Therefore, it is possible to save power and to obtain an eco-friendly and energy-recyclable circuit.

Control Circuit for Charging and Discharging

In the present invention, a control circuit for charging and discharging refers to a circuit for eliminating, or for reducing, or for controlling a residual charge produced in a driven element, a periphery portion thereof, or traces connected to a driven element. Typically, a control circuit for charging and discharging is composed of a driving circuit for controlling driving-on or driving-off of a driven element, a charging element, a charging path for charging the charging element, and a discharging path. Typically, the above charging element is a capacitor. It is preferable that a control circuit for charging and discharging includes a resistor or a rectifier. In addition, a control circuit for charging and discharging can include a transistor or a switching circuit to control charging and discharging.

Arrangement in Matrix with m Rows and n Columns

In the present invention, in a matrix with m rows and n columns, m and n are integers more than zero. For example, a matrix can be one row or one column of dot line, or can be one row and one column, in other word, one driven element. A matrix refers to such an arrangement, and is not restricted to the whole shape. A matrix includes not only a grid pattern, but also a flexible arrangement. An arrangement in a matrix includes wiring in a matrix. It is not always necessary to position in a matrix shape outwardly. However, positioning in a matrix shape outwardly is preferable for simplifying wiring in a control circuit for charging and discharging.

First Line Provided for Each Column

A first line can be a common line, a current driving line, a voltage driving line, a common source line, etc.

Second Line Provided for Each Row

A second line can be a common line, a current driving line, a voltage driving line, a common source line, etc.

Control of Activation

In the present invention, control of activation includes a control by a current, or by a flow of electron or charge, irrespective of an amount of a current such as a current control, a voltage control, an induced current control, an induced voltage control or the like.

Semiconductor Element with Parasitic Capacitance

Typically, in the present invention, semiconductor element with a parasitic capacitance refers to a light-emitting element, a photo detecting element or an control element for displaying, such as a light-emitting diode, a transistor, a photo diode, a photo transistor, a CCD, a memory, a liquid crystal device, an EL device (electroluminescence device). However, in the present invention, a semiconductor element with a parasitic capacitance also includes a semiconductor device having a plurality of semiconductor chips, or a semiconductor device having a semiconductor chip and a periphery circuit (typically, IC etc.), when a semiconductor device has a parasitic capacitance even if a semiconductor device is not a semiconductor chip itself. An element refers not only a single chip but also one unit of chips, in other word, one unit of semiconductor chip group.

Same Path for Charging Path and Discharging Path

Typically, "a charging path and a discharging path are the same path" refers to they share one common electrical path, and each current direction is opposite. An electrical functional element such as a transistor can be provided on the path. In this case, it is not always necessary to be the same internal path in the electrical functional element such as a transistor.

Discharging as Driving Current in Driving-On Status

Discharging as a driving current in driving-on refers to using a discharged residual charge as the whole of or a part of driving current. When a residual charge is discharged to a ground, the residual charge is wasted. However, when a residual charge is reused as a driving current, it is possible to save power. Therefore, such a construction is preferable.

DETAILED DESCRIPTION OF THE PREFERRED EMBODIMENTS

The following description will describe the embodiments according to the present invention with reference to the drawings. It should be appreciated, however, that the embodiments described below is an illustration of a control circuit for charging and discharging, an illuminating apparatus, and a driving method thereof to give a concrete form to technical ideas of the invention, and a control circuit for charging and discharging, an illuminating apparatus, and a driving method thereof according to the present invention are not especially limited to description below.

Figure 1:
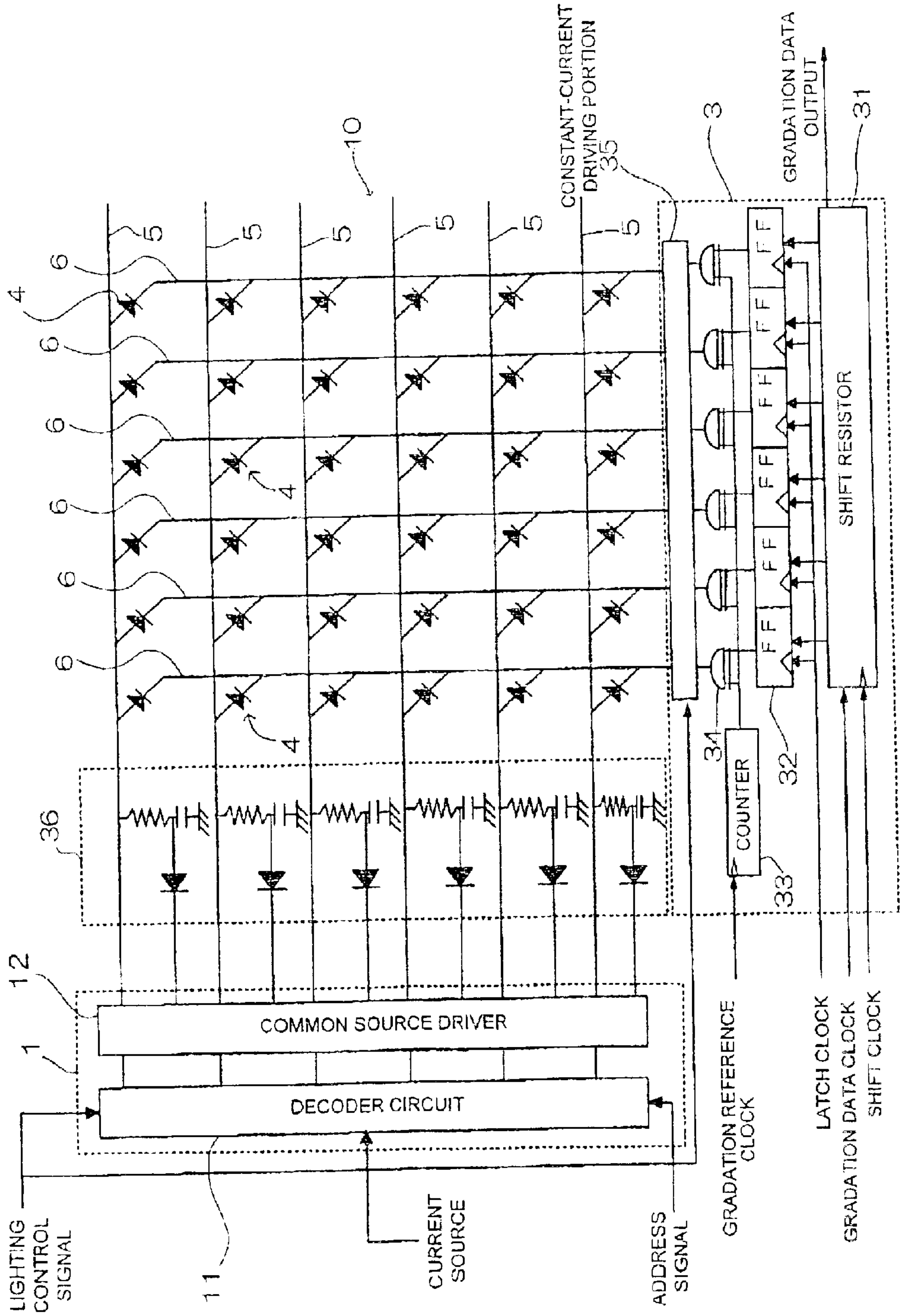
FIG. 1 is a block diagram schematically showing a construction of a display apparatus according to an embodiment according to the present invention.

FIG. 1 is a block diagram schematically showing a construction of an illuminating apparatus according to an embodiment of the present invention. As shown in the block diagram of FIG. 1, the illuminating apparatus of this embodiment comprises (1) a display portion including a plurality of light-emitting elements 4 arranged in a matrix with m rows and n columns, a current line 6 provided for each column and connected to a cathode terminal of each of the light-emitting elements 4 arranged in each column, and a common source line 5 provided for each row and connected to an anode terminal of each of the light-emitting elements 4 arranged in each row;

(2) a current-source switching circuit 1, which has m of switching circuits connected to the corresponding common source lines 5, capable of connecting the common source line addressed by an address signal input to a current source in a driving-on status, so as to provide the light-emitting element 4 connected to the common source lines with a current; and (3) a constant-current circuit portion 3, which has memory circuits storing n sets of gradation data of the display data input in series, activating the current line corresponding to each set of the gradation data during gradation width based on each set of the gradation data stored in the memory circuit in a light-on period determined by a lighting control signal input thereto; wherein, (4) the current-source switching circuit 1 further includes the driving circuit of a common source driver 12 controlling ON/OFF of the common source line, and an undesirable-emission-preventing circuit having a charging path connected to the anode terminal of each of the light-emitting elements and one end of the driving circuit, and a discharging path connected to the charging path and grounded via the driving circuit. The charging path is a path, through which a residual charge around the periphery of each light-emitting element passes to flow into a charging element while the common source line is deactivation status. Further, the discharging path is a path, through which the electric charge charged in the charging element passes to be discharged while the common source line is in an activation status.

In the illuminating apparatus of this embodiment mentioned above, both the current-source switching circuit 1 and the constant-current circuit portion 3 are switched based on the lighting control signal. When the lighting control signal indicates a light-on period, the current-source switching circuit 1 and the constant-current circuit portion 3 are in a driving-on status. In this driving-on status, the common source line addressed by the input address signal is connected to the current source. In the constant-current circuit portion 3, the current line is activated during gradation width based on the gradation data stored in each memory circuit in the driving-on status. Thus, each light-emitting element connected to the common source line addressed by the address signal emits during gradation width based on the gradation data. In addition, in driving-off status, the current-source switching circuit 1 is driving-off status. Accordingly, when the lighting control signal indicates the light-off period, electric charge remaining in each light-emitting element or in its periphery passes through charging path, and is charged in the charging element. While, when the lighting control signal indicates a light-on period, the electric charge charged in the charging element passes through the discharging path, and is discharged to a ground. Therefore, the residual charge can be almost eliminated in each light-emitting element or in its periphery.

Then, the light-on period and the light-off period are repeated successively. The light-emitting elements arranged in each row emit successively in each light-on period.

In the above construction, the electric charge remaining in each light-emitting element, which is in the light-on period, or in its periphery is discharged in the next light-off period, so that lighting control can always be performed without an undesirable charge remaining in each light-emitting element or in its periphery in the light-on period.

Accordingly, the illuminating apparatus of the present invention can control lighting without an influence of a residual charge. Therefore, the illuminating apparatus can achieve sufficient contrast in light-on, and can display in high quality.

CONCRETE CONSTRUCTION OF THE EMBODIMENT

The following description will describe an LED display according to a concrete construction of the embodiment with reference to FIG. 1.

Figure 2:
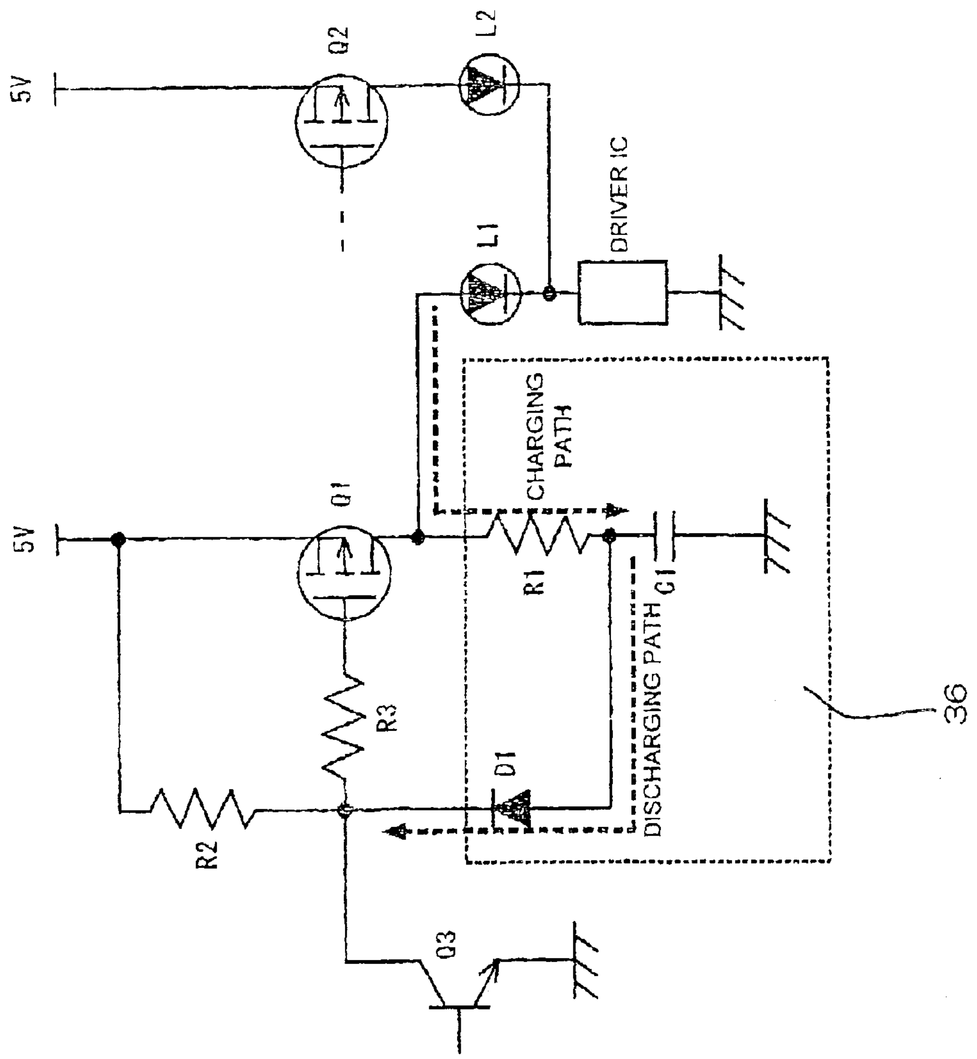
FIG. 2 is a circuit diagram schematically showing an undesirable-emission-preventing circuit as a concrete embodiment of the present invention.

In the concrete construction, the current-source switching circuit 1 is composed of a decoder circuit 11 and a common source driver 12 as shown in FIG. 1. The decoder circuit 11 controls ON/OFF of the common source driver 12 so as to connect the common source line 5, which is addressed based on the address signal when the lighting control signal is LOW level, to the current source. In this concrete construction, as shown in FIG. 2, the driving circuit, which includes a field effect transistor (FET), a switching element for controlling ON/OFF of the FET, and a plurality of resistors, can be provided in the common source driver 12. One end of a switching element is grounded, and another end is connected to a gate terminal of the FET via the resistor. In addition, a drain terminal of the FET is connected to a power supply, and a source terminal is connected to the anode terminal of each light-emitting element. Additionally, in this concrete construction, the source terminal side of the FET or the anode terminal side of each light-emitting element is connected to the charging element via the resistor so as to form the charging path. One end of the charging element is grounded. Moreover, in this concrete construction, another end of the charging element, which is not grounded, is connected to the gate terminal side of the FET via the rectifier so as to form the discharging path.

In addition, in the current-source switching circuit 1, the decoder circuit 11 performs control of the common source driver 12 that disconnects all common source lines to the current source when the lighting control signal is HIGH level.

The current-source switching circuit 1 connects only common source line 5 addressed by the address signal in the common source lines 5 of the LED display portion 10 to the current source when the lighting control signal is LOW level.

In addition, the constant-current circuit portion 3 is composed of a shift resistor 31, a memory circuit 32, a counter 33, a data comparator 34, and a constant-current driving portion 35.

In the constant-current circuit portion 3, the shift resistor 31 shifts the gradation data n sets of times in synchronism with a shift clock, and inputs the gradation data corresponding to n of current lines to the memory circuit 32 based on a latch clock, then the memory circuit 32 stores the gradation data. Subsequently, in the period that the lighting control signal is LOW level, the data comparator 34 compares the value counted at a gradation reference clock as a count clock by the counter 33 with the gradation data, and inputs it to the constant-current driving portion 35, then the constant-current driving portion 35 performs control that a constant current is applied to each current line during driving pulse width corresponding to the value of the gradation data.

As mentioned above, the current-source switching circuit 1 and the constant-current circuit portion 3 perform control of LED display gradation in the period that the lighting control signal is LOW level. In addition, the LED display portion 10 is disconnected to the current-source switching circuit 1 and the constant-current circuit portion 3 in the period that the lighting control signal is HIGH level.

In the LED display apparatus, the desired light-emitting diode emits by constant current driving of the LED display portion 10 in the period that the lighting control signal is LOW level, and constant current driving of the LED display portion 10 is not performed in the period that the lighting control signal is HIGH level.

However the LED display apparatus employs a light-emitting diode as the light-emitting element in the above embodiment, the invention is not limited to this construction. The driving circuit and the driving method in this embodiment can be applied to a display apparatus such as an electroluminescent display apparatus or a field emission type display apparatus (FED) employing the other kinds of light-emitting elements.

The following description will describe embodiments according to the present invention with reference to the drawings.

Embodiment 1

FIG. 1 is a block diagram schematically showing a construction of an LED display apparatus according to an embodiment of the present invention. The undesirable-emission-preventing circuit 36 in the invention is provided for each common source line. The LED display apparatus of this embodiment comprises an LED display portion including a plurality of light-emitting diodes 4 arranged in a matrix with m rows and n columns, a current line provided for each column and connected to a cathode terminal of each of the light-emitting diodes 4 arranged in each column, and a common source line provided for each row and connected to an anode terminal of each of the light-emitting diodes 4 arranged in each row; a current-source switching circuit 1, which has m of switching circuits connected to the corresponding common source lines 5, capable of connecting the common source line addressed by an address signal input to a current source in the light-on period determined by the lighting control signal input thereto, so as to provide the light-emitting diode 4 connected to the common source lines with a current; and a constant-current circuit portion 3, which has memory circuits storing n sets of gradation data of the display data input in series, activating the corresponding current line during gradation width based on the each gradation data stored in the memory circuit in the light-on period determined by the lighting control signal input thereto.

Further, FIG. 2 is a circuit diagram of the driving circuit of the common source driver and the undesirable-emission-preventing circuit 36 in this embodiment. In addition, the portion of the undesirable-emission-preventing circuit 36 of this embodiment is a portion shown by a dashed line in FIG. 2. In this embodiment, the driving circuit having FETs, transistors for controlling ON/OFF of the FETs, and a plurality of resistors can be provided for each common source line in the common source driver 12. Additionally, the undesirable-emission-preventing circuit 36 is provided for each driving circuit. For ease of explanation, the description will describe the case that the driving circuit, which has FETs (hereafter referred to as "Q1" or "Q2"), transistors (hereafter referred to as "Q3") for controlling ON/OFF of the FETs and a plurality of resistors, and the undesirable-emission-preventing circuit 36 are provided for a spontaneous common source line (hereafter referred to as "common source line 1") and one of other common source lines (hereafter referred to as "common source line 2").

In the driving circuit controlling activation of the common source line 1, an emitter terminal of Q3 is grounded, a collector terminal is connected to a gate terminal of Q1 via a resistor R3 (resistance 22 Ω), and a base terminal is connected to the decoder circuit. In addition, a drain terminal of Q1 is connected to the power supply (5V), and a source terminal is connected to an anode terminal of a spontaneous light-emitting diode (hereafter referred to as "L1") of n of the light-emitting diodes provided for the common source line 1. Additionally, as the undesirable-emission-preventing circuit in this embodiment, the source terminal side of Q1 and the anode terminal side of each light-emitting diode are connected to one end of a capacitor (hereafter referred to as "C1") via the resistor R1 so as to form a charging path, and another end of C1 is grounded. Moreover, the one end, which is not grounded, is connected to the gate terminal of Q1 and a collector terminal of Q3 via a diode (hereafter referred to as "D1") so as to form a discharging path leading from the charging path to a ground. The resistor R1 is adjusted its resistance and provided in the midway of the charging path so that it prevents charge from flowing into C1 over a predetermined amount when the common source line 1 is selected and is activation status, and further prevents a malfunction such as an oscillation of Q1 caused by a rise in gate voltage of Q1.

When the resistance of R1 is too low, a wasted current, which flows from Q1 through R1, D1, and Q3 to a grand during driving the light-emitting diode, increases. This increases consumption power and decreases energy efficiency, since an undesirable current, which does not act for an emission, is produced. Therefore, it is not preferable. On the other hand, when the resistance of R1 is too high (more than 2 kΩ, for example), R1 acts as a resistance for charging the capacitor C1 with the residual charge in the light-emitting diode L1. This blocks charging and is not preferable. While the optimum value is determined based on a resistance of the light-emitting diode in forward direction before conduction, we found that around 1 kΩ is adequate for preferable operation (for preventing an undesirable emission).

Further, when Q1 is changed from a driving-on status to a driving-off status, or Q3 is changed to a driving-on status, the diode D1 provided in midway of the discharging path is provided so that it prevents a current from flowing from the power supply (5 V) side into C1 via R2.

In the driving circuit controlling activation of the common source line 2, a driving circuit and an undesirable-emission-preventing circuit 36 similar to those provided for the common source line 1. A source terminal of Q2 is connected to an anode terminal of a spontaneous light-emitting diode (hereafter referred to as "L2") of n of the light-emitting diodes provided for the common source line 2. In addition, both L1 and L2 are connected to one end of a driver IC in the constant-current circuit portion 3. Another end of the driver IC is grounded.

In addition, to determine the optimum value of the capacitor for charging and discharging, when a capacitance of C1 is too high, if a light-emitting diode has a reverse direction leak current, a current, which flows from Q2 through L2, L1, and R1 to C1, increases, even though the residual charge in the light-emitting diode L1 can be easily charged to the capacitor C1 and the amount of the residual charge accumulation can be increased. This accelerates an undesirable emission and is not preferable. On the other hand, when a capacitance of C1 is too low, the capacitor C1 cannot accumulate a sufficient residual charge produced in the light-emitting diode L1. This cannot eliminate a sufficient residual charge and is not preferable. The reason is that a large amount of residual charge remains and causes an undesirable emission in the light-emitting diode L1. Considering the above points, we found that the optimum value of the capacitance of capacitor C1 is about 0.01 μF in typical embodiment according to the present invention.

Figure 6:
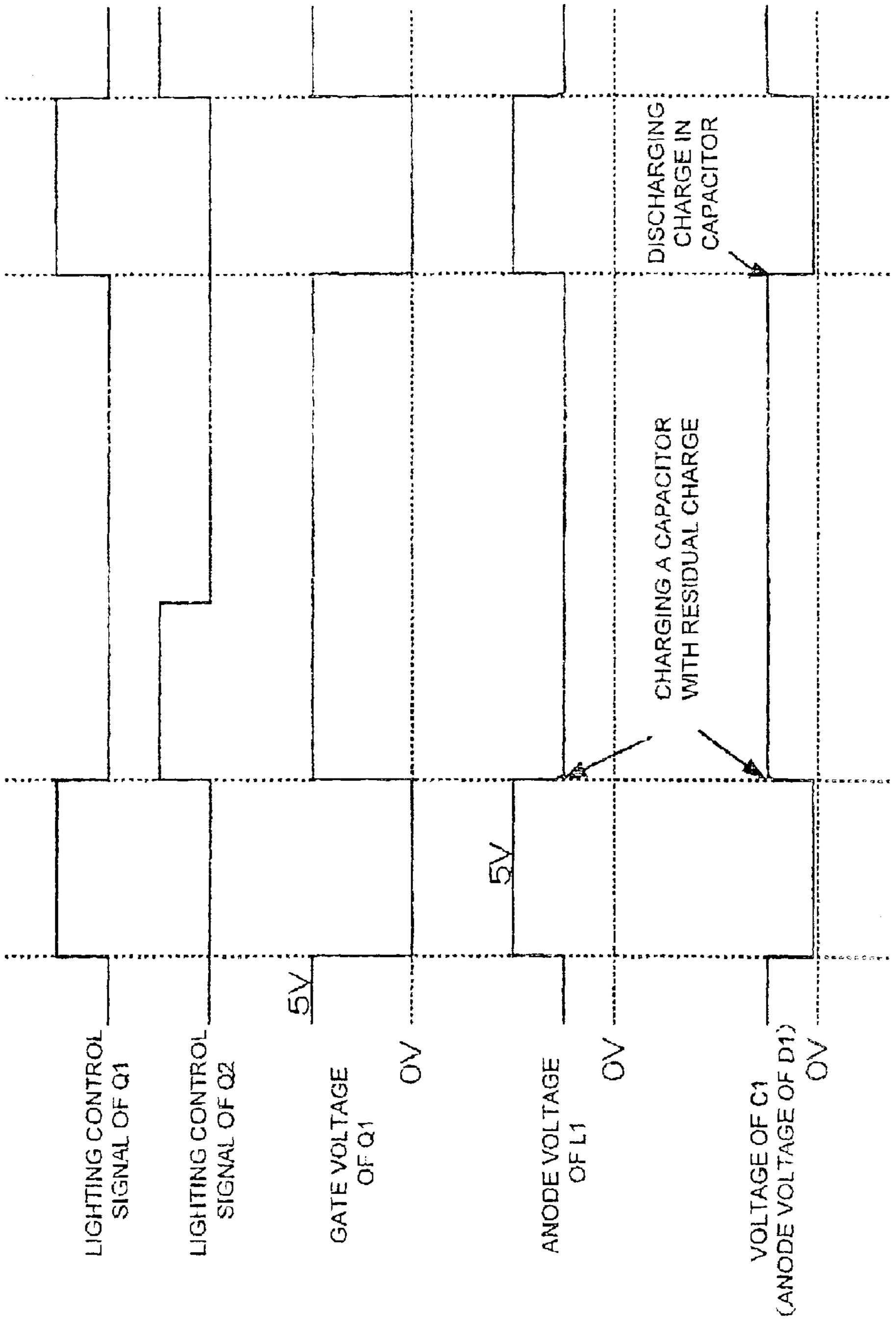
FIG. 6 is a timing chart of control on the display apparatus according to the present invention.

FIG. 6 is a timing chart of control of lighting in the LED display apparatus using the undesirable-emission-preventing circuit in the invention. The following description will describe a control method of lighting each common source line without remaining the residual charge in the periphery of L1 process by process.

1. Q1 is a p-channel FET, and an element, which is in a activation status when voltage in the gate terminal side is LOW (0 V), and is in a deactivation status when voltage in the gate terminal side is HIGH (5 V). In the status that the common source line 1 is selected, or that Q1 is activation status, the gate voltage of the Q1 is LOW, so that charge of C1 (capacitance 0.01 μF) passes through the discharging path including D1 and is discharged from the grounded emitter terminal side of Q3.

2. In the status that the common source line 2 is selected after the common source line 1, or that Q1 is deactivation status when the gate voltage of Q1 is HIGH, the residual charge in the periphery of L1, which is the cause of undesirable-emission passes through the charging path including the resistor R1, and is charged in C1. In addition, if D1 is not provided in the discharging path,
in the status that Q1 is a deactivation status, the voltage of gate terminal of Q1 is HIGH, so that C1 is fully charged with a current flowing into C1 from the power supply (5 V) through R2, whereby it is not charged with a current from the charging path anymore. While, because D1 is provided in the discharging path in the invention, C1 is not charged with the current from the discharging path, but C1 can be charged only with the residual charge from the charging path.

Figure 3:
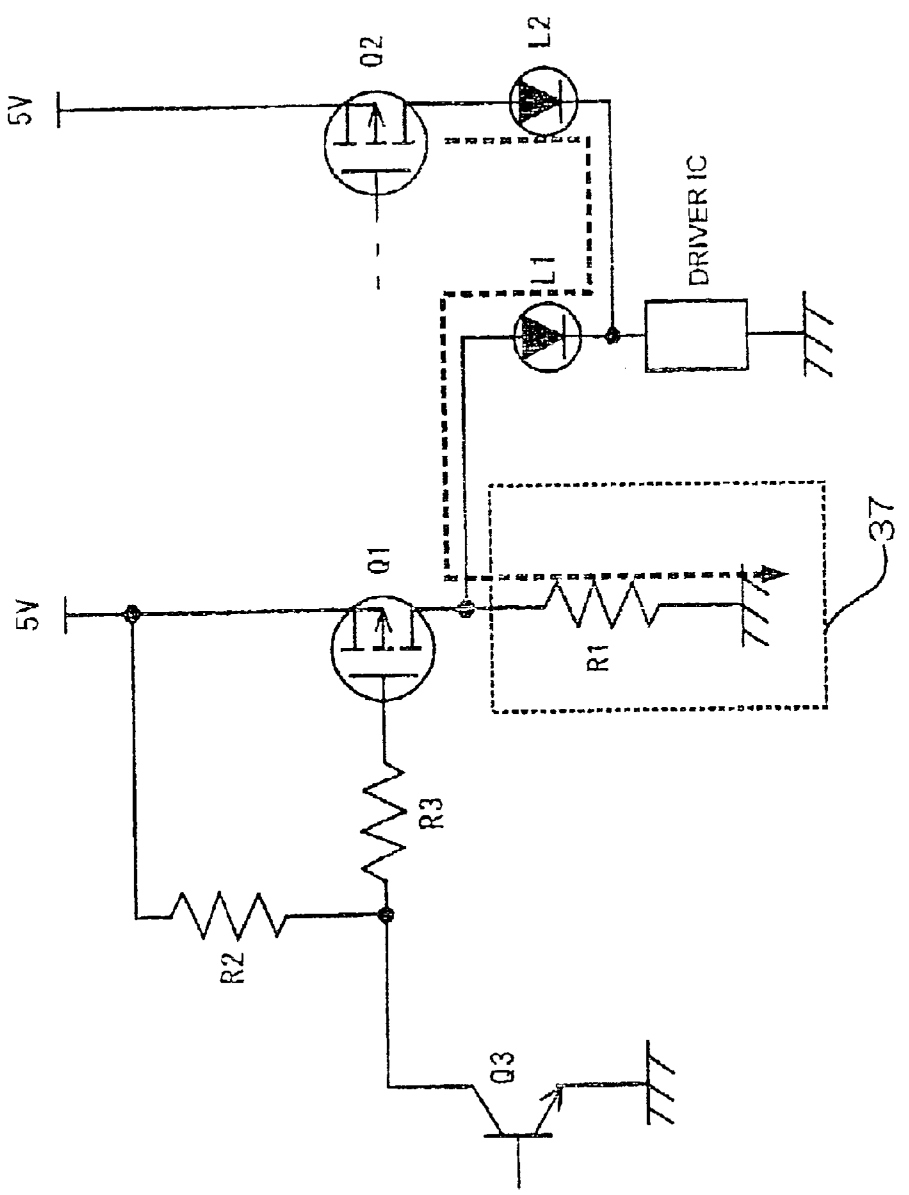
FIG. 3 is a circuit diagram for comparing with an undesirable-emission-preventing circuit according to the present invention.

Here, in the case that a circuit 37 shown as a comparative example in FIG. 3 is provided, if L1 does not perform a rectification function, L2, which should be in a light-off status, emits caused of a current flowing from L2 to L1, when the other common source line (except the common source line 1) is selected after the common source line 2. While, when the undesirable-emission-preventing circuit in the invention is provided, the residual charge is charged in C1, almost no charge flow anymore after the charge. In other words, because the undesirable-emission-preventing circuit is provided in the display apparatus, in the invention, charge flowing into L2 can be minimized when L2 should be controlled not emitting. Therefore, it is possible to prevent reduction in display quality caused of undesirable-emission.

3. When Q1 changes to activation status, voltage of the gate terminal side is LOW, so that charge remaining in C1 is discharged again.

As mentioned above, since the processes 1–3 are occurred repeatedly, it was observed that an undesirable-emission could be prevented in the whole display apparatus.

Figure 5:
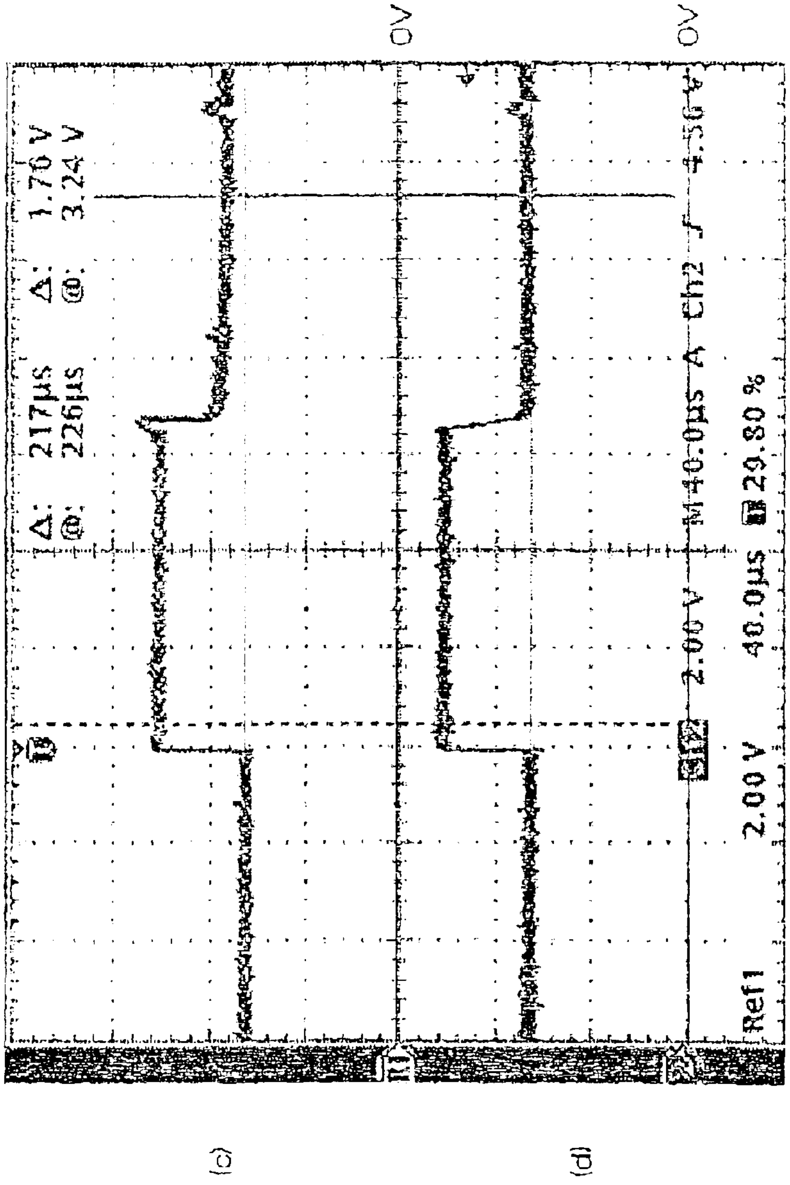
FIG. 5 is a chart of experimental results for confirming validity of an undesirable-emission-preventing circuit according to the present invention.

Further, voltage of the anode terminal side of L1 was measured, to confirm whether the undesirable-emission-preventing circuit 36 in the invention operates effectively or not. FIG. 5(*c*) shows time variation in the anode terminal side of L1 without the undesirable-emission-preventing circuit. FIG. 5(*d*) shows time variation in the anode terminal side of L1 with the undesirable-emission-preventing circuit in the invention. In the case without the undesirable-emission-preventing circuit, as shown in FIG. 5(*c*), at the moment Q1 changes to deactivation status the residual charge starts passing L1 immediately, so that voltage of the anode terminal side of L1 gradually drops to the voltage level just moments before that Q1 changes to a driving-on status. On the other hand, in the case with the undesirable-emission-preventing circuit in the invention, as shown in FIG. 5(*d*), at the moment Q1 changes to deactivation status the residual charge starts being charged in capacitor, so that voltage of the anode terminal side of L1 instantaneously drops to the voltage level just moments before that Q1 changes to a driving-on status. These show that an undesirable current is produced in the anode terminal side of L1 when Q1 is in a deactivation status in the case without the undesirable-emission-preventing circuit, and almost no current is produced in the anode terminal side of L1 when Q1 is in a deactivation status in the case with the undesirable-emission-preventing circuit. Thus, it was confirmed that the undesirable-emission-preventing circuit in the invention could prevent an undesirable emission.

Figure 4:
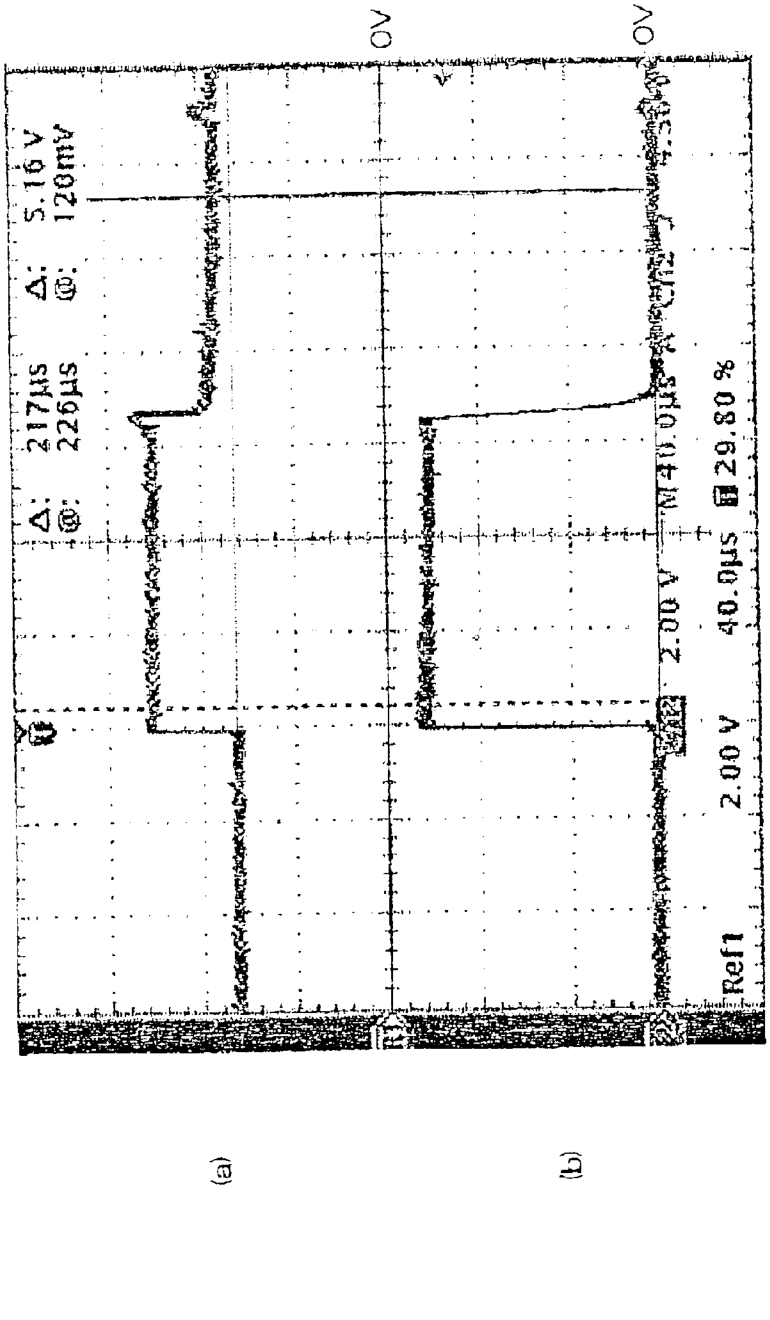
FIG. 4 is a chart of experimental results for comparing with an undesirable-emission-preventing circuit according to the present invention.

In the circuit 37 shown as a comparative example in FIG. 3, voltage of the anode terminal side of L1 was measured similarly. FIG. 4(*a*) shows time variation in the anode terminal side of L1 without the circuit 37. FIG. 4(*b*) shows time variation in the anode terminal side of L1 with the circuit 37. In the case without the circuit 37, as shown in FIG. 4(*a*), at the moment Q1 changes to a deactivation status, the residual charge starts passing L1, so that voltage of the anode terminal side of L1 gradually drops to the voltage level just moments before that Q1 changes to driving-on status. In the case with the circuit in the invention 37, as shown in FIG. 4(*b*), at the moment Q1 changes to a deactivation status, the residual charge starts being charged in capacitor, so that voltage of the anode terminal side of L1 instantaneously drops to 0 V. Further if L1 does not perform a rectification function, a reverse current is produced, and an undesirable-emission is occurred in L1. On the other hand, in the case with the undesirable-emission-preventing circuit 36 including the capacitor in the invention, as shown in FIG. 5(*d*), voltage of the anode terminal side of L1 drops not to 0 V, but to an equilibrium point. Therefore, a reverse current does not flow after that, so that undesirable-emission is not occurred.

In addition, when an LED, which did not perform a rectification function, was connected to L1 in parallel, almost no undesirable-emission was occurred in L1.

COMPARATIVE EXAMPLE

FIG. 3 is a circuit diagram for comparing with the driving circuit of the invention. In addition, the portion of the circuit 37 for comparing with the invention is a portion shown by a dashed line in this drawing. As shown in FIG. 3, the circuit 37 is composed of only a resistor provided for the anode terminal of the light-emitting element and the source terminal of Q1 (Q2). One end of the resistor is connected to the anode terminal of the light-emitting element and the source terminal of Q1 (Q2). Another end is grounded. In the circuit construction of this comparative example, when an LED did not perform a rectification function, a reverse current was produced, and an undesirable-emission was confirmed in the whole display apparatus.

Embodiment 2

The following description will describe the second embodiment according to the present invention with reference to the drawings. FIG. 7 to FIG. 10 show a second driving method according to the present invention. The second driving method is an embodiment, in which a residual charge in a current line is eliminated when scanning changes into the next common switch line.

In FIG. 7 to FIG. 10, current lines (driving lines), common switch lines (scanning lines), charge elements connected at locations corresponding to intersections of them, a common switch line scanning circuit, a current line driving circuit, an anode control circuit for charging and discharging, and a driving control circuit are shown as $A_1$–$A_{256}$, $B_1$–$B_{64}$, $E_{1,1}$–$E_{256,64}$, 41, 42, 43, and 44 respectively.

The common switch line scanning circuit 41 has scanning switches 45$_1$–45$_{64}$ for sequentially scanning common switch lines $B_1$–$B_{64}$. One terminal of each of the scanning switches 45$_1$–45$_{64}$ is connected to a reverse bias Vcc (10 V, for example), which is a current source. Another terminal is connected to a ground (0 V).

The current line driving circuit 42 has current sources 42$_1$–42$_{256}$, which are driving sources, driving switches 46$_1$–46$_{256}$ for selecting current lines $A_1$–$A_{256}$. When a desired driving switch is ON, the current line is connected to one of current sources 42$_1$–42$_{256}$ for driving.

The anode control circuit for charging and discharging 43 has current lines $A_1$–$A_{256}$, capacitors and diodes, which eliminates the residual charge in the charge elements $E_{1,1}$–$E_{256,64}$, connected at the locations corresponding to the intersections.

The driving control circuit 44 performs ON/OFF control of the scanning switches 45$_1$–45$_{64}$ and the driving switches 46$_1$–46$_{256}$, and charging-and-discharging control of the anode control circuit for charging and discharging 43.

Next, the following description will describe a driving operation in the second driving method according to the present invention with reference to FIG. 7 to FIG. 10. The operation in the following description will describe as one example that the common line switch$B_2$ is scanned and the charge elements $E_{2,2}$ and $E_{3,2}$, after common line switch $B_1$ is scanned and the charge elements $E_{1,1}$ and $E_{2,1}$. For ease of explanation, the driven-on element is shown as a diode symbol, and a driven-off element is shown as a capacitor symbol. The reverse bias Vcc applied to the common switch lines $B_1$–$B_{64}$ is set to 10 V as same as the current voltage of the apparatus.

First, the scanning switch 45$_1$ is switched to the 0 V side, and the common switch $B_1$ is scanned. The reverse bias voltage 10 V is applied to the other common switch lines $B_2$–$B_{64}$ by the scanning switches 45$_2$–45$_{64}$. The current lines $A_1$ and $A_2$ are connected to the current sources 42$_1$ and 42$_2$ by the driving switches 46$_1$ and 46$_2$. In addition, the residual charges in the other current lines $A_3$–$A_{256}$ are eliminated by the anode control circuit for charging and discharging 43.

Figure 7:
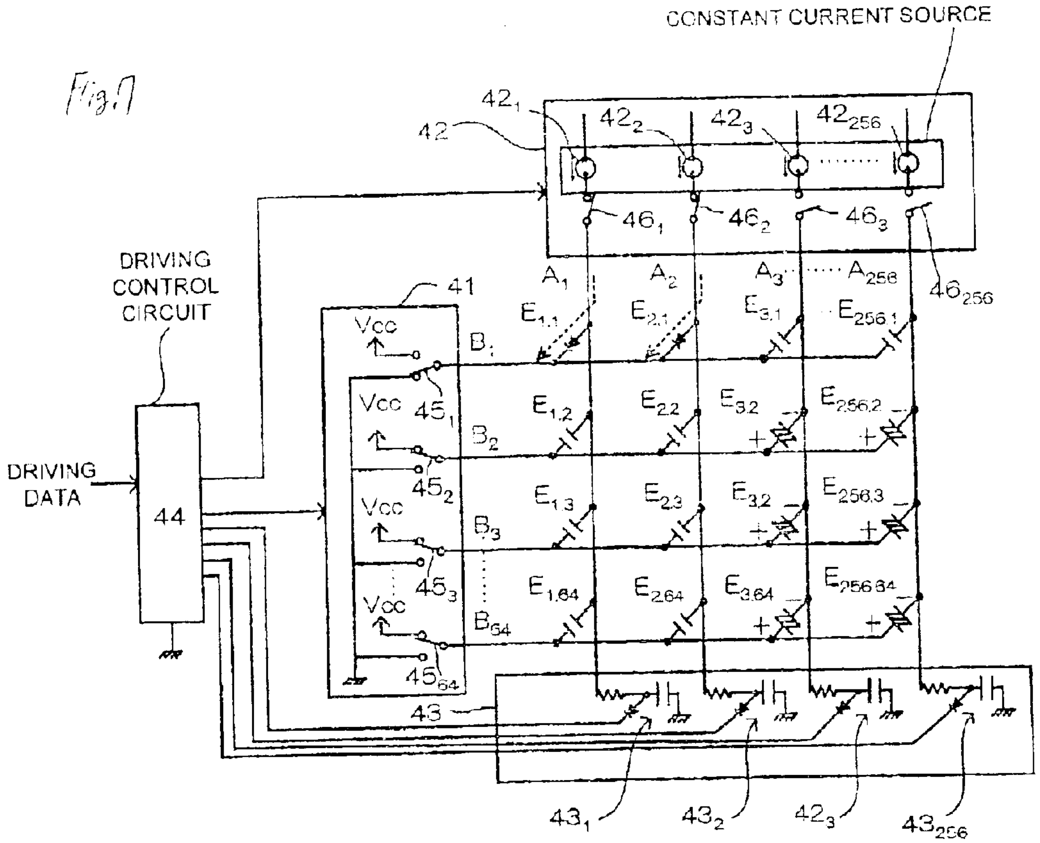
FIG. 7 is a block diagram showing a first process of a second driving method according to the present invention.

Accordingly, in FIG. 7, only the charge elements $E_{1,1}$ and $E_{2,1}$ are biased in forward direction, and the driving currents flow from the current sources 42$_1$ and 42$_2$ as shown by the arrows. Only the charge elements $E_{1,1}$ and $E_{2,1}$ are driven. In FIG. 7, the elements shown as hatched capacitors are charged in the polarity shown in FIG. 7. When the driving status in FIG. 7 is changed to the status that the charge elements $E_{2,2}$ and $E_{3,2}$ are driven in FIG. 10, the residual charges are eliminated by charging and discharging the residual charges as follows.

Figure 8:
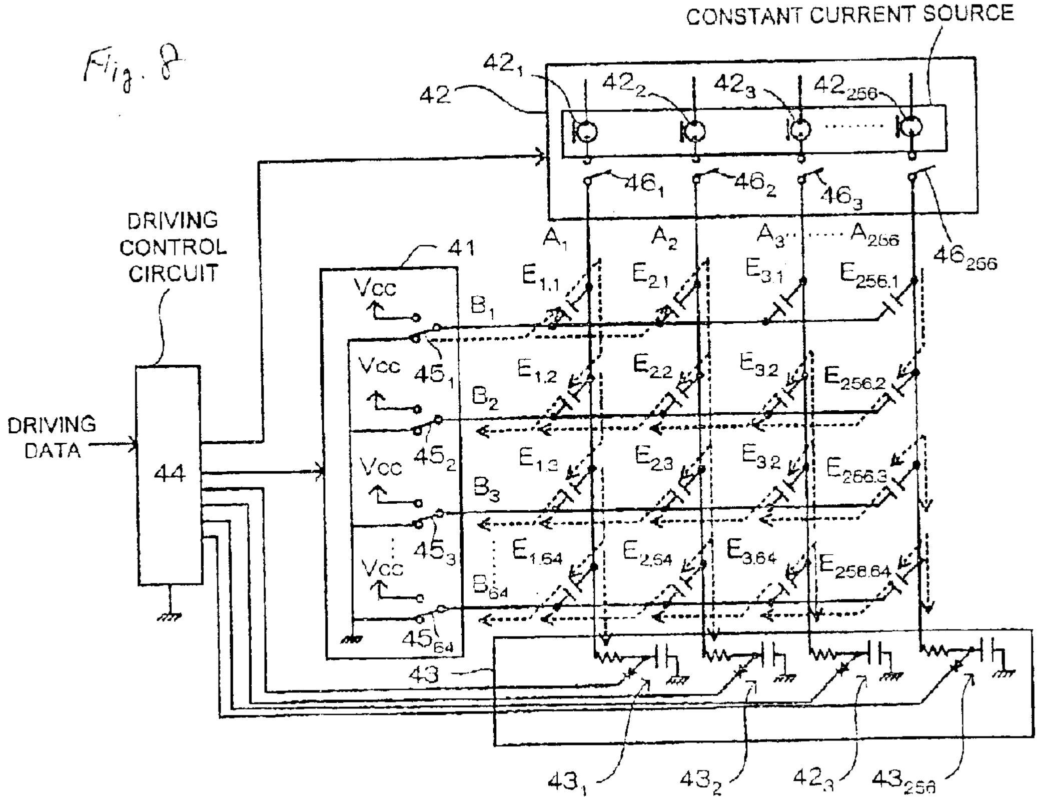
FIG. 8 is a block diagram showing a second process of a second driving method according to the present invention.
Figure 10:
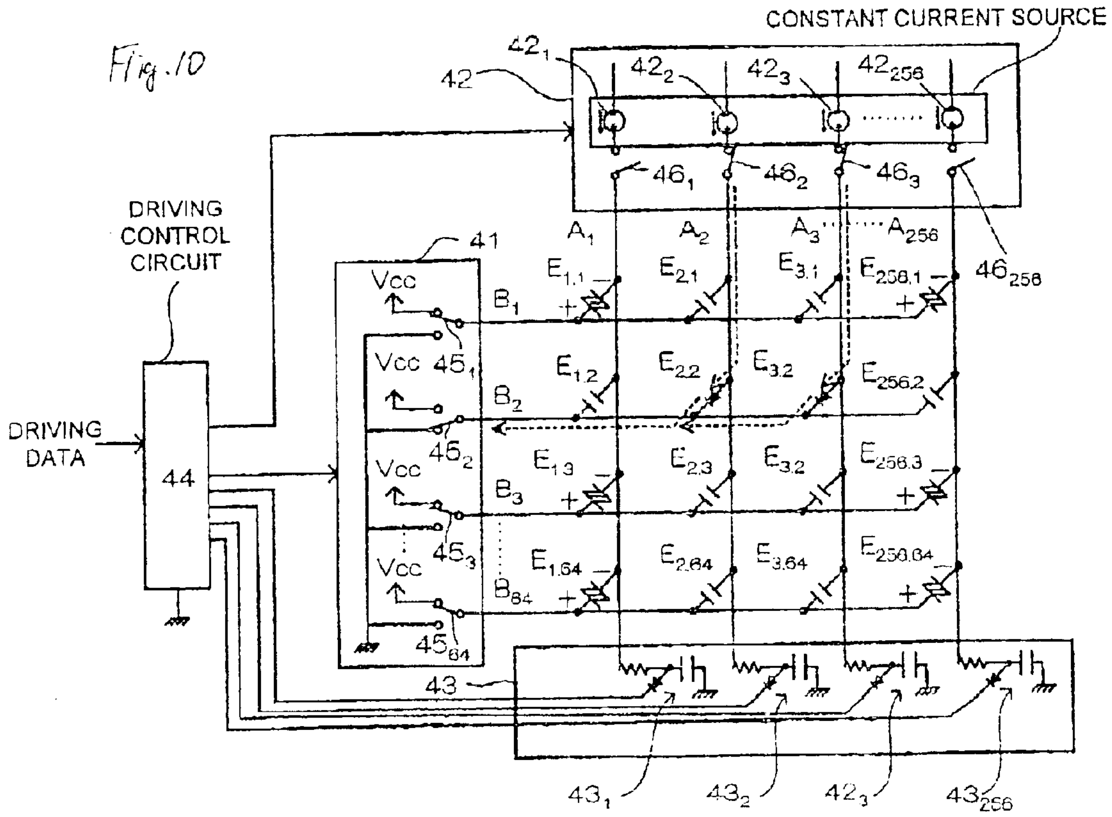
FIG. 10 is a block diagram showing a forth process of a second driving method according to the present invention.

That is, before scanning changes from the common switch line $B_1$ in the FIG. 7 to the common switch line $B_1$ in FIG. 10, the residual charges in the current lines $A_1$–$A_{256}$ are eliminated by the anode control circuit for charging and discharging 43, as shown in FIG. 8. Thus, the charges charged in the charge elements are charged and discharged as the arrows shown in FIG. 8. The residual charges in the charge elements are eliminated.

After the residual charges in all the charge elements are eliminated as mentioned above, only the scanning switch 45$_2$ corresponding to the common switch line $B_2$ is switched to the 0 V side, and the common switch $B_2$ is scanned. Only driving switches 46$_2$ and 46$_3$ are switched to the current sources 42$_2$ and 42$_3$ sides. The anode control circuit for charging and discharging 43$_1$ and 43$_4$–43$_{256}$ are charged and discharged, so as to eliminate the residual charges in the current lines $A_1$ and $A_4$–$A_{256}$.

After the common switch line $B_2$ is scanned by switching the switches as mentioned above, the residual charges in all the charge elements are eliminated. Accordingly, charging currents flow into the charge elements $E_{2,2}$ and $E_{3,2}$ to be driven next via a plurality of paths as shown by the arrows in FIG. 9, then the parasitic capacitance C of each charge element is charged.

That is, a charging current flows to the charge element $E_{2,2}$ not only via the path from the current source 42$_2$ through the driving switch 46$_2$, the current line$A_2$, and the charge element $E_{2,2}$ to the scanning switch 45$_2$, but also via the path from the scanning switch 45$_1$ through common switch line $B_1$, the charge element $E_{2,1}$ and the charge element $E_{2,2}$ to scanning switch 45$_2$, the path from the scanning switch 45$_3$ through common switch line $B_3$, the charge element $E_{2,3}$ and the charge element $E_{2,2}$ to scanning switch 45$_2$, . . . , the path from the scanning switch 45$_{64}$ through common switch line $B_{64}$, the charge element $E_{2,64}$ and the charge element $E_{2,2}$ to scanning switch 45$_2$. After the charge element $E_{2,2}$ is charged and is driven the a plurality of these currents, the charge element is normally driven as shown in FIG. 10.

Further, a charging current also flows to the charge element $E_{3,2}$ not only via the path from the current source 42$_3$ through the driving switch 46$_3$, the current line$A_3$, and the charge element $E_{3,2}$ to the scanning switch 45$_2$, but also via the path from the scanning switch 45$_1$ through common switch line $B_1$, the charge element $E_{3,1}$ and the charge element $E_{3,2}$ to scanning switch 45$_2$, the path from the scanning switch 45$_3$ through common switch line $B_3$, the charge element $E_{3,3}$ and the charge element $E_{3,2}$ to scanning switch 45$_2$, . . . , the path from the scanning switch 45$_{64}$ through common switch line $B_{64}$, the charge element $E_{3,64}$ and the charge element $E_{3,2}$ to scanning switch 45$_2$. After the charge element $E_{3,2}$ is charged and is driven by these plurality of currents, the charge element changes into a normal status as shown in FIG. 10.

As mentioned above, in the second driving method, the residual charge in the current line is temporarily eliminated before change to the next scanning. Therefore, the charge element on the changed scanning line can be quickly driven when scanning changes to next line.

Figure 9:
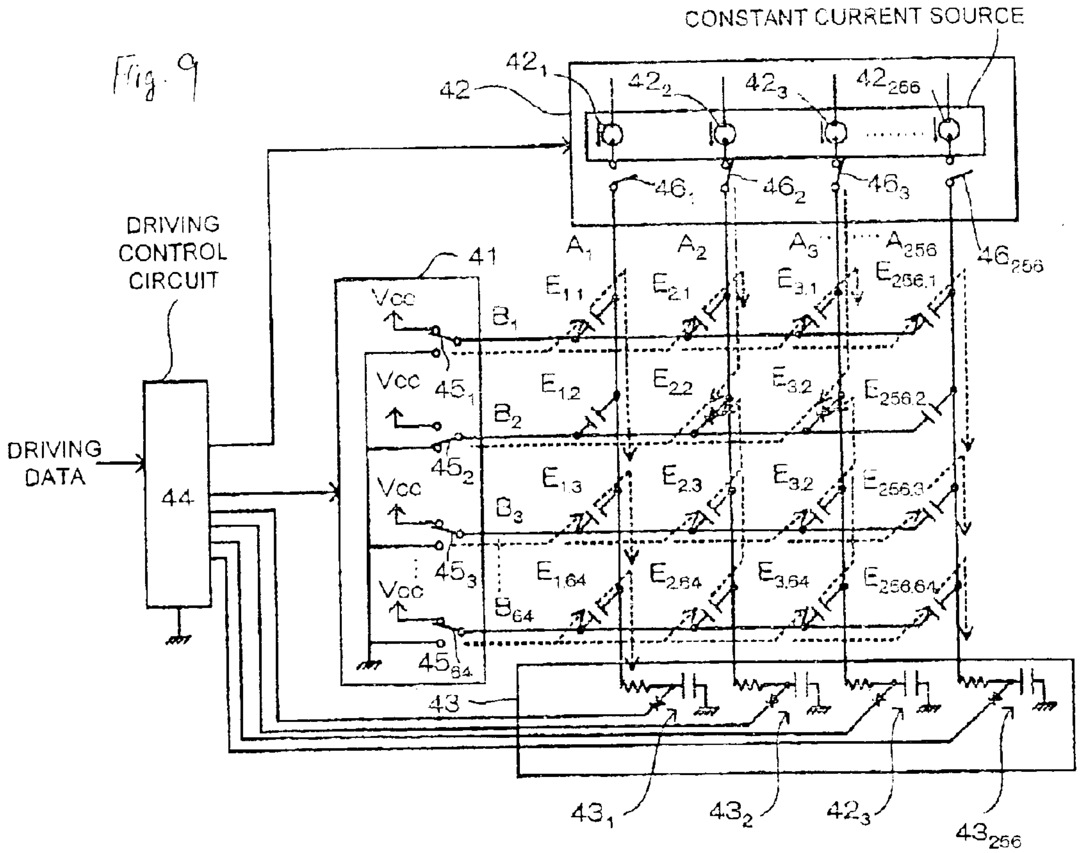
FIG. 9 is a block diagram showing a third process of a second driving method according to the present invention.

In addition, although the charge elements to be driven other than the charge element $E_{2,2}$ and $E_{3,2}$ are also charged via similar paths as shown in FIG. 9, the charging direction is a reverse direction. Therefore, the charge elements other than the charge element $E_{2,2}$ and $E_{3,2}$ are not undesirably driven.

Figure 11:
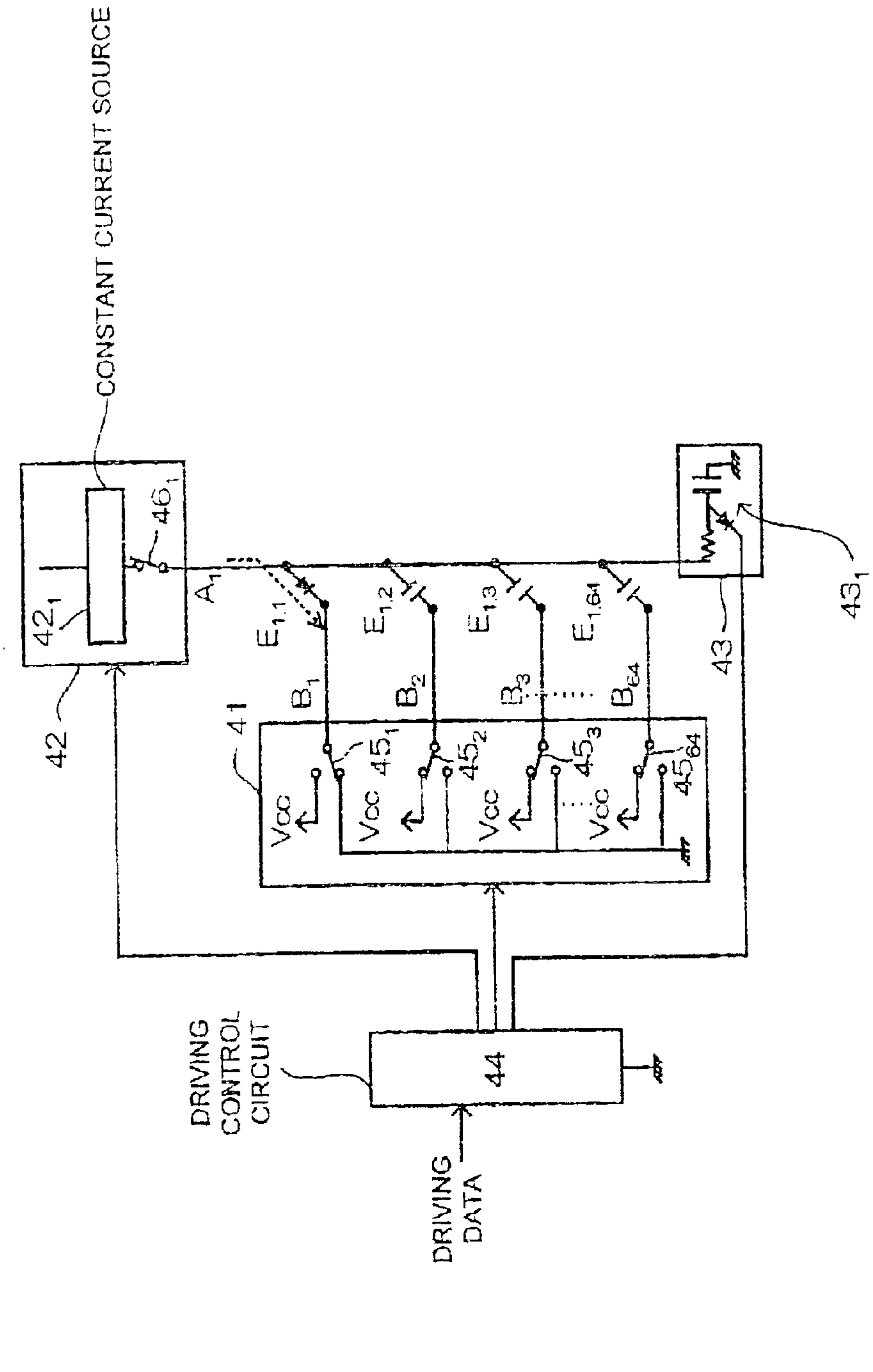
FIG. 11 is a block diagram showing another embodiment according to the present invention.

In the embodiment of FIG. 7 to FIG. 10, although the current sources 42$_1$–42$_{256}$ are used as driving sources, voltage sources can be also similarly used. In this embodiment, a matrix of the charge elements are driven as one module, however the charge elements are not restricted to a matrix shape, a dot line of the charge elements aligned in one line can be also used as one module or line. In such a construction, as shown in FIG. 11, each of the current lines $A_1$–$A_{256}$ is driven as one module. However, each predetermined number of the current lines $A_1$–$A_{256}$ can be also driven as one module. In addition, each predetermined number of the current lines, which are connected in the column direction, can be also driven as one module. In this construction, since one switching common line corresponds to one charge element, a current is hardly provided to the other elements via the switching common line even if a leak etc. occurs. This construction is preferable, because an undesirable emission can be reliably prevented. The numbers of current lines, common switching lines, charge elements connected at locations corresponding to intersections of them can be spontaneously employed. The numbers are not restricted to these embodiments. A control circuit for charging and discharging can be provided for each charge element. Various electrical function elements such as a rectifying element, a light-emitting element, a photodiode, transistors including a diode, a bipolar transistor, an FET, or a HEMT, or elements and modules having a liquid crystal or a capacitor with a parasitic capacitance are can be used in the present invention. In addition, different modules can be combined as one module. The present invention is not restricted to these embodiments.

It will be clearly understood with reference to FIG. 9 that the charge elements $E_{2,2}$ and $E_{3,2}$ to be driven next is not charged only by the current sources 42$_2$ and 42$_3$, but also from the common switching lines $B_1$ and $B_3$–$B_{64}$, which the reverse biases are applied to, via the other charge elements connected to the current lines $A_2$ and $A_3$.

Accordingly, when the number of charge elements connected to the current lines is high, only a charging current via the other charge elements can drive the charge elements $E_{2,2}$ and $E_{3,2}$ even it is not too much. In such a case, when the common switching line is scanned at a period shorter than duration of driving time by the charging current via the other charge elements, the current sources 42$_1$–42$_{256}$ of the anode driving circuit 2 can be eliminated.

The above description is described as a cathode scanning and anode driving system, however the present invention can be applied to an anode scanning and cathode driving system.

As mentioned above, the parasitic capacitance of the charge elements to be driven is charged not only via drive lines by switching a scanning position to next scanning line, but also via the parasitic capacitance of the other charge element not to be driven by the reverse biases. Therefore, it is possible to raise the voltage between both ends of the charge elements to be driven and to drive the charge elements quickly. In addition, since the charge elements are also charged via the other charge elements, it is possible to reduce a capacity of each driving source and to downsize the driving device.

Furthermore, although all current sources in the driving line side can be eliminated, the charge elements can be driven at high-speed. Therefore, the driving device can be simpler and can be further downsized.

The above description is described as an example in that one terminal of the scanning switches 45$_1$–45$_{64}$ in the common switching scanning circuit 41 are connected to the reverse biases Vcc, which is 10 V, for example, however the reverse biases Vcc can be lower, furthermore the reverse biases Vcc can be eliminated as being opened. It is preferable that the reverse biases Vcc are eliminated, because the other charge elements are not undesirably driven even if a leak occurs.

The current source 42 is provided in the anode side in this embodiment, it can be provided in the cathode side. Additionally, a circuit or an element, which is driven by a voltage source instead of the current source, can be used.

Embodiment 3

Figure 12:
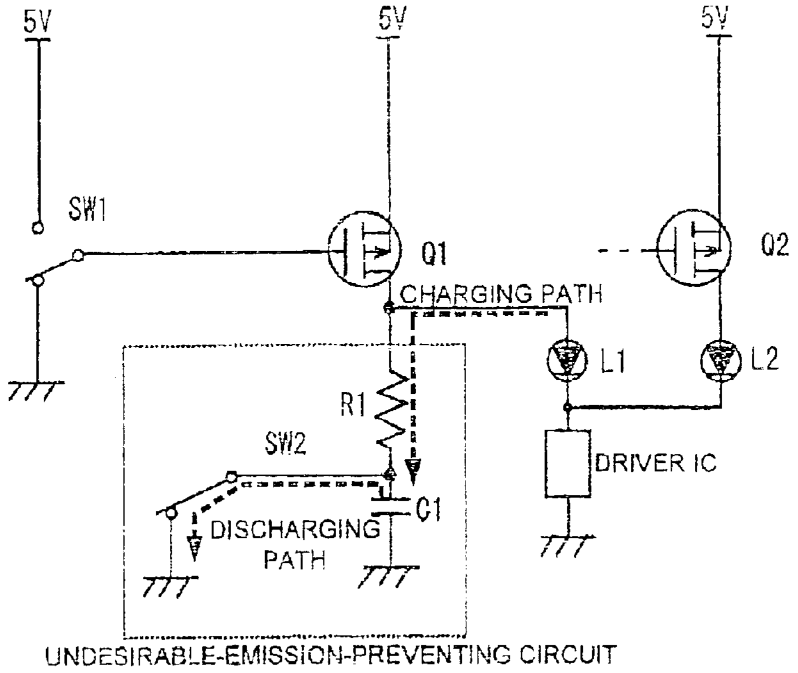
FIG. 12 is a circuit diagram schematically showing an undesirable-emission-preventing circuit according to an embodiment 3.

The following description will describe an undesirable-emission-preventing circuit of a control circuit for charging and discharging of the embodiment 3 according to the present invention with reference to FIG. 12.

In FIG. 12, a switch (SW2) operates in synchronization with a switch (SW1). When the switch (SW1) is connected to a power supply (5V), the switch (SW2) is opened, and when the switch (SW1) is grounded, the switch (SW2) is grounded. In addition, when the switch (SW1) is grounded, a transistor (Q1) is turned on, and a light-emitting diode (L1) emits corresponding to a driving status of a driver IC. At this time, the switch (SW2) is grounded, and a residual charge accumulated in a capacitor (C1) is discharged through the switch (SW2).

When the switch (SW1) is connected to the power supply (5V), the transistor (Q1) is turned off, and the light emitting diode (L1) is in a driven-off status irrespective of a driving status of the driver IC. While a transistor (Q1) turns off, the switch (SW2) is opened and the unnecessary residual charge accumulated in the light emitting diode (L1) is charged in the capacitor (C1) through the resistor (R1). Therefore, an undesirable emission of the light emitting diode (L1) by the residual charge in the light emitting diode (L1) can be prevented properly.

If the light emitting diode (L1) does not have a rectifying function and produces a reverse bias leak current for example, when the transistor (Q1) is turned off and the transistor (Q2) is turned on, there is a current path from Q2, through L2, L1 (leak), R1 and SW2 to a ground. However, since the capacitor (C1) is charged with the residual charge in the light emitting diode (L1), a current does not flow any more in this path, and an undesirable emission of light emitting diode (L2) does not occur.

The above descriptions in the embodiments are described as examples in that the transistors (Q1, Q2, . . . , Qn) are p-channel MOSFETs. However these are typical examples, elements or circuits with a switching function can be used, and they are not restricted to p-channel MOSFETs In addition, the embodiment 3 has a feature that the independent discharging path only for discharging, and there is no electric functional elements. Therefore, it is possible to quickly discharge from the capacitor (C1), and this discharging can bring the residual charge in substantially zero level. In this embodiment, the switch (SW2) operates in synchronization with the switch (SW1), however they should not always synchronize each other. They can operate so as to charge and discharge according to a light-on status or a light-off status of the diode. Regarding to discharging timing, discharging can be performed in spontaneous time range during a drive-on, or a light-on period of the diodes.

Embodiment 4

Figure 13:
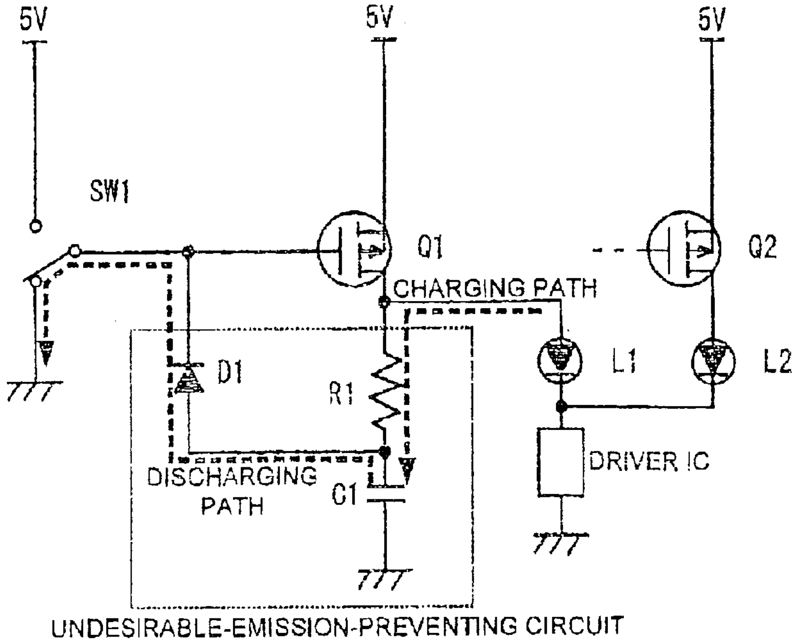
FIG. 13 is a circuit diagram schematically showing an undesirable-emission-preventing circuit according to an embodiment 4.

The following description will describe an undesirable-emission-preventing circuit of a charging-and-discharging preventing circuit of the embodiment 4 according to the present invention with reference to FIG. 13. In the undesirable-emission-preventing circuit according to this embodiment, the switch (SW2) in the undesirable-emission-preventing circuit according to the embodiment 3 is eliminated, and the capacitor (C1) is connected to the switch (SW1) via the diode (D1). Only control of the switch (SW1) operates as the undesirable-emission-preventing circuit of the embodiment 3. FIG. 13 is a circuit diagram, which is simplified based on the circuit in FIG. 2. The operation will be briefly described as follows.

In addition, when the switch (SW1) is grounded, the transistor (Q1) is turned on, and the light-emitting diode (L1) emits corresponding to a driving status of the driver IC. At this time, the charge accumulated in the capacitor (C1) is discharged via a path from C1 through D1 and SW1 to a ground.

When the switch (SW1) is connected to the power supply (5V), the transistor (Q1) is turned off, and the light emitting diode (L1) is driven-off irrespective of a driving status of the driver IC. While the transistor (Q1) turns off, the unnecessary residual charge accumulated in the light emitting diode (L1) is charged in the capacitor (C1) through the resistor (R1). An undesirable emission of the light emitting diode (L1) by the residual charge in the anode side of the light emitting diode (L1) can be prevented. In addition, the capacitor (C1) is charged only with the residual charge in the light emitting diode (L1) by the rectifying function of the diode (D1).

If the light emitting diode (L1) does not have a rectifying function and produces a reverse bias leak current, when the transistor (Q1) is turned off and the transistor (Q2) is turned on, there is a current path from Q2, through L2, L1 and R1 to C1. However, since the capacitor (C1) has a capacitance capable of charging only the residual charge in the light emitting diode (L1), an undesirable emission of light emitting diode (L2) does not occur. If the capacitor (C1) has a capacitance relatively larger than the residual charge in the light emitting diode (L1), an undesirable emission of light emitting diode (L2) can occur caused by a relatively high current flow in the above current path. In this embodiment, we found that the optimum value of the capacitance of capacitor C1 is about 0.01 $\mu$F to operate properly considering the light emitting diode (L1) and to prevent an undesirable emission properly.

In addition, the timing chart of FIG. 6 is capable of driving in this embodiment. In this embodiment, even if a leak current is produced in the LED (L1), there are no current paths to leak from the LED (L2) to LED (L1). Therefore, it is possible to reduce an undesirable emission of light emitting diode (L2) effectively.

In this embodiment, the discharging path from the capacitor (C1) is composed of a part of the trace in the control circuit of the transistor (Q1) Therefore, it is possible to reduce traces and the capacitance of the traces. The number of switches is reduced, so that its control can be simplified, and its cost can be reduced.

Embodiment 5

Figure 14:
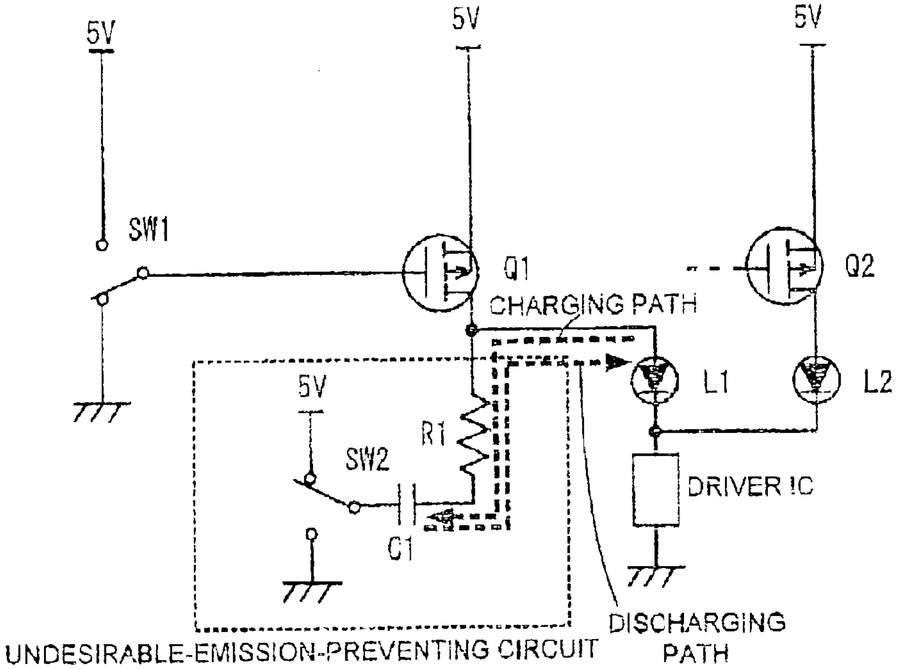
FIG. 14 is a circuit diagram schematically showing an undesirable-emission-preventing circuit according to an embodiment 5.

The following description will describe an undesirable-emission-preventing circuit of the embodiment 5 according to the present invention with reference to FIG. 14. In the embodiment 5, the residual charge accumulated in the capacitor (C1) is not discharge to a ground, but acts as a driving current through a discharging path, which is the same path as a charging path. A switch (SW2) operates in synchronization with a switch (SW1). When the switch (SW1) is grounded, the switch (SW2) is connected to a power supply (5V), and when the switch (SW1) is connected to a power supply (5V), the switch (SW2) is grounded.

When the switch (SW1) is grounded, a transistor (Q1) is turned on, and an emission of a light-emitting diode (L1) is controlled by a driver IC. At this time, the switch (SW2) is connected to the power supply (5V), and the residual charge accumulated in the capacitor (C1) is discharged through a resistor (R1) toward the light-emitting diode (L1).

When the switch (SW1) is connected to the power supply (5V), the transistor (Q1) is turned off, and the light emitting diode (L1) is light-off irrespective of a driving status of the driver IC. At this time, the switch (SW2) is grounded and one end of the capacitor (C1) is grounded. Therefore, the unnecessary residual charge accumulated in the anode side of the light emitting diode (L1) is charged in the capacitor (C1).

If the light emitting diode (L1) does not have a rectifying function, when the transistor (Q1) is turned off and the transistor (Q2) is turned on, there is a current path from Q2, through L2, L1, R1 and C1 to a ground. However, since the capacitor (C1) is charged with the residual charge in the light emitting diode (L1), in this path, a current does not flow any more and an undesirable emission of light emitting diode (L2) does not occur. If the capacitor (C1) has a capacitance relatively larger than the residual charge in the light emitting diode (L1), an undesirable emission of light emitting diode (L2) can occur caused by a relatively high current flow in the above current path. In this embodiment, we found that the optimum value of the capacitance of capacitor C1 is about 0.01 μF to operate properly considering the light emitting diode (L1) and to prevent an undesirable emission properly.

In the circuit according to this embodiment, the resistor (R1) can be eliminated. In addition, it should not be restricted that the power supply (5 V, in this embodiment) connected to the switch (SW2) is the same voltage as the power supply (5 V) connected to the switch (SW1). A voltage of the power supply (5 V, in this embodiment) connected to the switch (SW2) can be set so as to quickly discharge from the capacitor (C1) to the anode side of the light emitting diode via the discharging path.

In the embodiment 5, the charging path and the discharging path are the same path (each current direction is opposite). This can reduce the number of the traces and the length of the traces. Therefore, it is possible to reduce the weight and the cost, and to drive at high-speed. Furthermore, since the residual charge accumulated in the capacitor (C1) is not wasted by grounding but is reused as the whole of or a part of driving current. Therefore, it is possible to save power consumption and to achieve low power consumption and low current driving.

Embodiment 6

Figure 15:
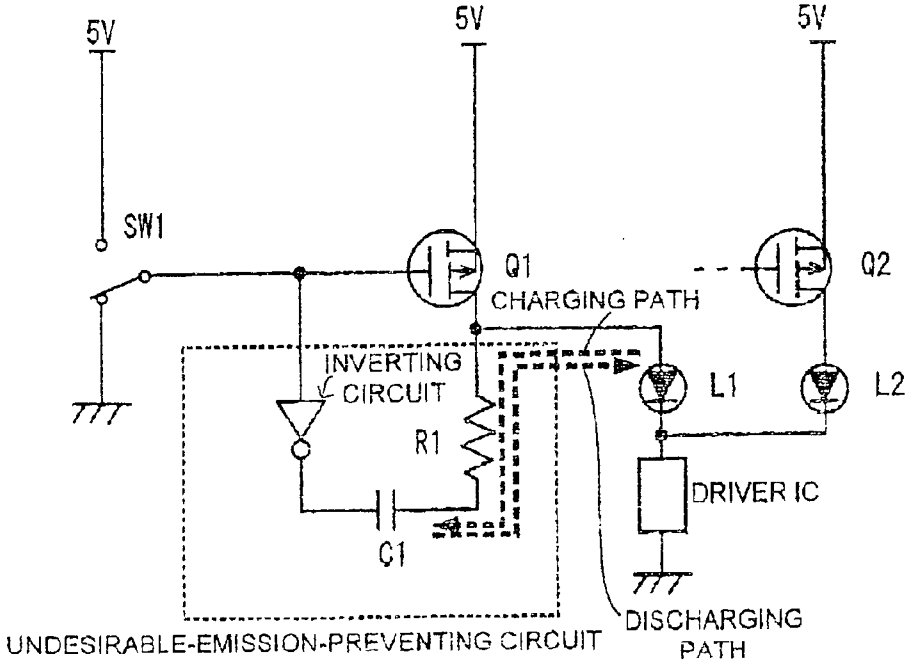
FIG. 15 is a circuit diagram schematically showing an undesirable-emission-preventing circuit according to an embodiment 6.

The following description will describe an undesirable-emission-preventing circuit of the embodiment 6 according to the present invention with reference to FIG. 15. In the embodiment 6, instead of the switch (SW2) in the undesirable-emission-preventing circuit of the embodiment 6, an inverter circuit is provided between a switch (SW1) and a capacitor (C1). Only control of the switch (SW1) operates as the undesirable-emission-preventing circuit according to the embodiment 5.

When the switch (SW1) is grounded, a transistor (Q1) is turned on, and a emission of a light-emitting diode (L1) is controlled by a driver IC. One end of the capacitor (C1) is connected to the power supply (5 V) via the inverter circuit. At this time, the residual charge accumulated in the capacitor (C1) is discharged toward the light-emitting diode (L1) via a resistor (R1), and the discharging current acts as the whole of or a part of driving current for the emission.

When the switch (SW1) is connected to the power supply (5V), Q1 is turned off. At this time, one end of the capacitor (C1) is grounded, and the unnecessary residual charge accumulated in the anode side of the light emitting diode (L1) is charged in the capacitor (C1).

If the light emitting diode (L1) does not have a rectifying function, when the transistor (Q1) is turned off and the transistor (Q2) is turned on, there is a current path from Q2, through L2, L1, R1 and C1 to a ground. However, since the capacitor (C1) is charged with the residual charge in the light emitting diode (L1), in this path, current does not flow any more and an undesirable emission of light emitting diode (L2) does not occur.

If the capacitor (C1) has a capacitance relatively larger than the residual charge in the light emitting diode (L1), an undesirable emission of light emitting diode (L2) can occur caused by a relatively high current flow in the above current path. In this embodiment, we found that the optimum value of the capacitance of capacitor C1 is about 0.01 μF to operate properly considering the light emitting diode (L1) and to prevent an undesirable emission properly.

In the circuit according to this embodiment, the resistor (R1) can be eliminated. In the embodiment 6, the charging path and the discharging path are the same path (each current direction is opposite). This can reduce the number of the traces and the length of the traces. Therefore, it is possible to reduce the weight and the cost, and to drive at high-speed. Furthermore, since the residual charge accumulated in the capacitor (C1) is not wasted by grounding but is reused as the whole of or a part of driving current. Therefore, it is possible to save power consumption and to achieve low power consumption and low current driving.

Embodiment 7

Figure 16:
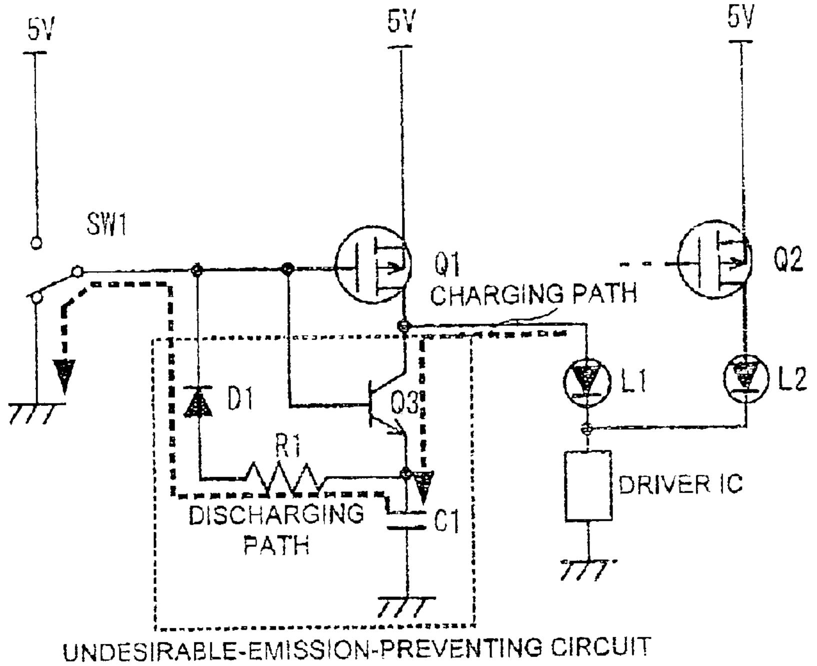
FIG. 16 is a circuit diagram schematically showing an undesirable-emission-preventing circuit according to an embodiment 7.

The following description will describe an undesirable-emission-preventing circuit of the embodiment 7 according to the present invention with reference to FIG. 16. In the undesirable-emission-preventing circuit according to the embodiment 7, a transistor (Q3) is additionally provided on the charging path between the light-emitting diode (L1) and the capacitor (C1), and a resistor (R1) provided on the discharging path. The residual charge in the light emitting diode (L1) can be charged in the capacitor (C1) at higher speed than the embodiment 4 by switching the transistor (Q3). Since the resister is not provided on the charging path, an amount of heat or power consumption by the resistor can be reduced. In this sense, it is possible to save power.

When the switch (SW1) is grounded, a transistor (Q1) is turned on, and an emission of a light-emitting diode (L1) is controlled by a driver IC. At this time, the charge accumulated in the capacitor (C1) is discharged via a path from C1 through D1 and SW1 to a ground. Since the transistor (Q3) is OFF at this time, a current does not flow to the capacitor (C1) through the transistor (Q3).

When the switch (SW1) is connected to the power supply (5V), the transistor (Q1) is turned off, and the light emitting diode (L1) is driven-off irrespective of a driving status of the driver IC. While a transistor (Q1) turns off, the transistor (Q3) is turned on, and the unnecessary residual charge accumulated in the light emitting diode (L1) is charged in the capacitor (C1) through resistor (R1). Therefore, an undesirable emission of the light emitting diode (L1) by the residual charge of the light emitting diode (L1) can be prevented. The capacitor (C1) is charged only with the residual charge in the light emitting diode (L1) by the rectifying function of the diode (D1).

If the light emitting diode (L1) does not have a rectifying function and produces a reverse bias leak current, when the transistor (Q1) is turned off and the transistor (Q2) is turned on, there is a current path from Q2, through L2, L1, Q3 and C1 to a ground. However, since the capacitor (C1) is charged with the residual charge in the light emitting diode (L1), in this path, a current does not flow any more and an undesirable emission of light emitting diode (L2) does not occur. If the capacitor (C1) has a capacitance relatively larger than the residual charge in the light emitting diode (L1), an undesirable emission of light emitting diode (L2) can occur caused by a relatively high current flow in the above current path. In this embodiment, we found that the optimum value of the capacitance of capacitor C1 is about 0.01 μF to operate properly considering the light emitting diode (L1) and to prevent an undesirable emission properly.

In this circuit, the resistor (R1) is provided to prevent an oscillation of the transistor (Q1).

Embodiment 8

Figure 17:
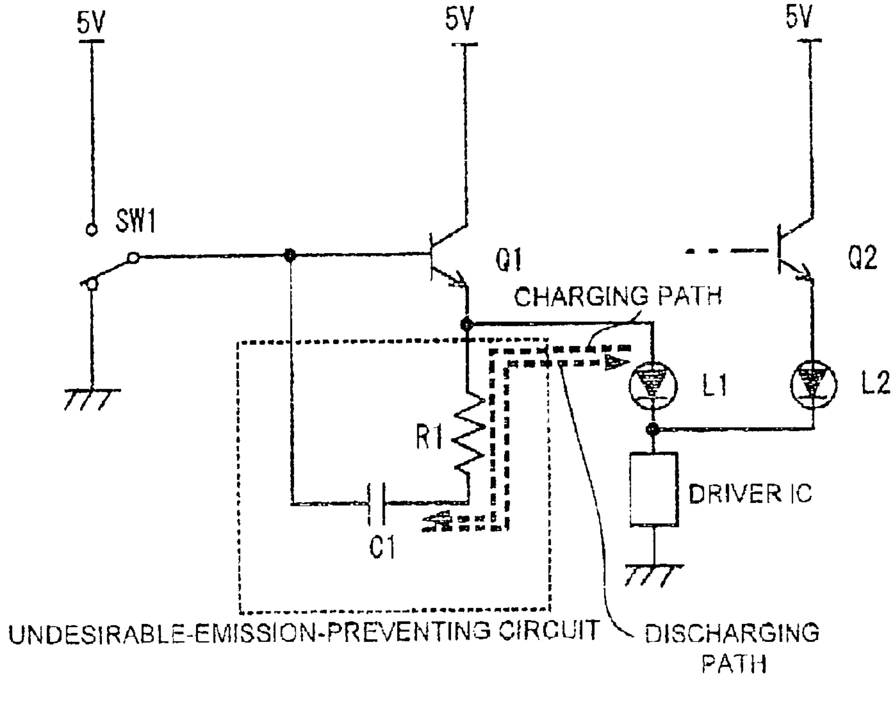
FIG. 17 is a circuit diagram schematically showing an undesirable-emission-preventing circuit according to an embodiment 8.

The following description will describe an undesirable-emission-preventing circuit of the embodiment 8 according to the present invention with reference to FIG. 17. In the embodiment 8, transistors (Q1) and (Q2) are bipolar transistors so as to eliminate a residual charge of a light emitting diode (L1) without an inverter circuit.

When the switch (SW1) is connected to a power supply (5V), the transistor (Q1) is turned off, and the emission of the light emitting diode (L1) is controlled by a driver IC. At this time, one end of the capacitor C1 is connected to the power supply (5 V) via the switch SW1, and the charge accumulated in the capacitor (C1) is discharged toward the light emitting diode L1 as the whole of or a part of a driving current via a resister R1.

When the switch (SW1) is grounded, the transistor (Q1) is turned off.

At this time, one end of the capacitor (C1) is grounded, and the unnecessary charge accumulated in anode side of the light emitting diode (L1) is charge in the capacitor (C1).

If the light emitting diode (L1) does not have a rectifying function, when the transistor (Q1) is turned off and the transistor (Q2) is turned on, there is a current path from Q2, through L2, L1, R1 and C1 to a ground. However, since the capacitor (C1) is charged with the residual charge in the light emitting diode (L1), in this path, current does not flow any more and an undesirable emission of light emitting diode (L2) does not occur. If the capacitor (C1) has a capacitance relatively larger than the residual charge in the light emitting diode (L1), an undesirable emission of light emitting diode (L2) can occur caused by a relatively high current flow in the above current path. In this embodiment, we found that the optimum value of the capacitance of capacitor C1 is about 0.01 $\mu$F to operate properly considering the light emitting diode (L1) and to prevent an undesirable emission properly.

In this circuit, the resistor (R1) can be eliminated. In this embodiment, it is possible to simplify the circuit construction. The circuit according to this embodiment has an advantage that the number of traces and the length of the traces can be reduced and the weight can be reduced. Therefore, it is preferable that the circuit is used especially for a large-scale LED display or is used under space-saving requirement on traces.

As mentioned above, in a control circuit for charging and discharging, an illuminating apparatus and a driving method thereof according to the present invention, a residual charge accumulated in a light-emitting element, a driven element, a periphery portion, a connected trace or the like during driving on status is discharged via a discharging path during driving-on status. Therefore, an influence of the residual charge can be substantially eliminated in the driving-on status, in which a predetermined light-emitting element emits or a driven element is driven. It is possible to provide a control circuit for charging and discharging, an illuminating apparatus and a driving method thereof, which can obtain a high-quality display or a charge-element-driving apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A control circuit for charging and discharging comprising a driven element with a driving-on status and a driving-off status;

a charging element, whose one end is grounded;

a driving circuit, which is connected to the driven element, for controlling the driving-on status or the driving-off status in the driven element;

a charging path, which is connected to the driven element, for charging the charging element with a residual charge, which is produced in the driven element and/or a line connected to the driven element during the driving-off status, and a discharging path, which is connected to the charging element, for discharging the residual charge from the charging element to a ground in the driving-on status.

2. The control circuit for charging and discharging according to claim 1, said driven element further comprising a plurality of the driven elements arranged in a matrix with m rows and n columns, a first line provided for each column and connected to one terminal of each of the driven elements arranged in each column, and a second line provided for each row and connected to another terminal of each of the driven elements arranged in each row, wherein, the control circuit controls activation of at least one of the first line and the second line.

3. The control circuit for charging and discharging according to claim 1, wherein, the charging path and discharging path, whose one end is grounded through the charging element.

4. The control circuit for charging and discharging according to claim 1, wherein, the charging path includes a load.

5. The control circuit for charging and discharging according to claim 1, wherein, the discharging path includes a rectifier.

6. The control circuit for charging and discharging according to claim 1, wherein, the charging path is connected to an anode terminal side of the driven element.

7. The control circuit for charging and discharging according to claim 5, wherein, one end of the rectifier is connected to the charging element, and another end is grounded.

8. The control circuit for charging and discharging according to claim 1, wherein, the driven element is a semiconductor element with a parasitic capacitance.

9. The control circuit for charging and discharging according to claim 1, wherein, the charging element is a capacitor.

10. The control circuit for charging and discharging according to claim 4, wherein, the load is a resistor.

11. The control circuit for charging and discharging according to claim 5, wherein, the rectifier is a diode.

12. The control circuit for charging and discharging according to claim 1, wherein, the driven element is a light-emitting semiconductor.

13. The control circuit for charging and discharging according to claim 1, wherein, the driven element is an LED.

14. The control circuit for charging and discharging according to claim 1, wherein, the driven element is a light-emitting element, and the control circuit for charging and discharging acts as an undesirable-emission-preventing circuit for preventing an undesirable emission in the light-emitting element.

15. The control circuit for charging and discharging according to claim 1, wherein, the charging path and the discharging path are the same path, and the residual charge charged in the charging element is discharged as a driving current for the driven element during driving-on status.

16. An illuminating apparatus comprising a driven element with a driving-on status and a driving-off status;

a charging element, whose one end is grounded;

a driving circuit, which is connected to the driven element, for controlling the driving-on status or the driving-off status in the driven element;

a charging path, which is connected to the driven element, for charging the charging element with a residual charge, which is produced in the driven element and/or a line connected to the driven element during the driving-off status, and a discharging path, which is connected to the charging element, for discharging the residual charge from the charging element to a ground in the driving-on status.

17. The illuminating apparatus according to claim 16, the illuminating apparatus further comprising a plurality of the driven elements arranged in a matrix with m rows and n columns, a first line provided for each column and connected to one terminal of each of the driven elements arranged in each column, and a second line provided for each row and connected to another terminal of each of the driven elements arranged in each row, wherein, the illuminating apparatus controls activation of at least one of the first line and the second line.

18. The illuminating apparatus according to claim 16, wherein, the charging path and discharging path, whose one end is grounded through the charging element.

19. The illuminating apparatus according to claim 16, wherein, the charging path includes a load.

20. The illuminating apparatus according to claim 16, wherein, the discharging path includes a rectifier.

21. The illuminating apparatus according to claim 16, wherein, the charging path is connected to an anode terminal side of the driven element.

22. The illuminating apparatus according to claim 20, wherein, one end of the rectifier is connected to the charging element, and another end is grounded.

23. The illuminating apparatus according to claim 16, wherein, the driven element is a semiconductor element with a parasitic capacitance.

24. The illuminating apparatus according to claim 16, wherein, the charging element is a capacitor.

25. The illuminating apparatus according to claim 19, wherein, the load is a resistor.

26. The illuminating apparatus according to claim 20, wherein, the rectifier is a diode.

27. The illuminating apparatus according to claim 16, wherein, the driven element is a light-emitting semiconductor.

28. The illuminating apparatus according to claim 16, wherein, the driven element is an LED.

29. The illuminating apparatus according to claim 16, wherein, the driven element is a light-emitting element, and the illuminating apparatus acts as an undesirable-emission-preventing circuit for preventing an undesirable emission in the light-emitting element.

30. The illuminating apparatus according to claim 16, wherein, the charging path and the discharging path are the same path, and the residual charge charged in the charging element is discharged as a driving current for the driven element during driving-on status.

31. An illuminating apparatus comprising:

a display portion including a plurality of light-emitting elements arranged in a matrix with m rows and n columns, a current line provided for each column and connected to a cathode terminal of each of the light-emitting elements arranged in each column, and a common source line provided for each row and connected to an anode terminal of each of the light-emitting elements arranged in each row; and a driving circuit, whose status of a driving-on status or a diving-off status is controlled by a lighting control signal input thereto, for controlling activation of each common source line based on display data input in each driving-on status; wherein, the driving circuit includes an undesirable-emission-preventing circuit having a charging path connected to the anode terminal of each of the light-emitting elements and the driving circuit, and charging a charging element with a residual charge, which is produced in the anode terminal side of light-emitting element when the status is changed from the driving-on status to the driving-off status, in the driving-off status, and a discharging path connected to the charging path, and discharging the residual charge from the charging element to a ground in the driving-on status.

32. The illuminating apparatus according to claim 31, wherein, the discharging path is connected to the charging path, and is grounded via the driving circuit.

33. The illuminating apparatus according to claim 31, wherein, the driving circuit further includes a current-source switching circuit, which has m of switching circuits connected to the corresponding common source lines, capable of connecting the common source line addressed by an address signal input thereto in the driving-on status to a current source, and a constant-current circuit portion, which has memory circuits storing n sets of gradation data of the display data input in series, activating the current line corresponding to each set of the gradation data during gradation width based on each set of the gradation data stored in the memory circuit in the driving-on status.

34. The illuminating apparatus according to claim 31, wherein, the charging path includes the charging element, whose one end is connected to the anode terminal side of each of the light-emitting elements and another end is grounded.

35. The illuminating apparatus according to claim 31, wherein, the discharging path includes a rectifier, whose anode terminal is connected to the charging path and cathode terminal is connected to the ground side.

36. The illuminating apparatus according to claim 31, wherein, the charging path includes at least one resistor.

37. The illuminating apparatus according to claim 31, wherein, the light-emitting element is a light-emitting diode.

38. The illuminating apparatus according to claim 31, wherein, the charging element is a capacitor.

39. The illuminating apparatus according to claim 31, wherein, the rectifier is a diode.

40. The illuminating apparatus according to claim 31, wherein, the illuminating apparatus is an LED display.

41. A driving method of an illuminating apparatus, which has a display portion including a plurality of light-emitting elements arranged in a matrix with m rows and n columns, a current line provided for each column and connected to a cathode terminal of each of the light-emitting elements arranged in each column, and a common source line provided for each row and connected to an anode terminal of each of the light-emitting elements arranged in each row, and a driving circuit, whose status of a driving-on status or a diving-off status is controlled by a lighting control signal input thereto, for controlling activation of each common source line based on display data input in each driving-on status, comprising the steps of:

controlling the status, driving-on status or driving-off status, by an input lighting control signal controlling the status, light-on status or light-off status;

controlling activation at one end of each common source line and at one end of the current source line based on display data input in each driving-on status;

charging a charging element with a residual charge, which is produced in the anode terminal side of light-emitting element when status is changed from the driving-on status to the driving-off status, in the driving-off status by a charging path connected to an anode terminal of each light-emitting elements and the driving circuit; and discharging the residual charge from the charging element to a ground in the driving-on status by a discharging path connected to the charging path and grounded.

* * * * *